(12) United States Patent  
Stockburger et al.

(10) Patent No.: US 9,265,131 B2  
(45) Date of Patent: Feb. 16, 2016

(54) INTELLIGENT LIGHTING DEVICE WITH MULTIPLE LUMINAIRES, IN PARTICULAR FREE-STANDING LUMINAIRES OR DESK-MOUNTED LUMINAIRES AND A METHOD FOR OPERATING A LIGHTING DEVICE OF THIS TYPE

(71) Applicants: Marc Stockburger, Villingen-Schwenningen (DE); Klaus-Jürgen Hahn, Villingen-Schwenningen (DE)

(72) Inventors: Marc Stockburger, Villingen-Schwenningen (DE); Klaus-Jürgen Hahn, Villingen-Schwenningen (DE)

(73) Assignee: Herbert Waldmann GmbH & Co. KG, Villingen-Schwenningen ( * ) Notice: Subject to any disclaimer, the term of this patent is extended or adjusted under 35 U.S.C. 154(b) by 179 days.

(21) Appl. No.: 13/774,509

(22) Filed: Feb. 22, 2013

(65) Prior Publication Data  
US 2013/0293149 A1    Nov. 7, 2013

(30) Foreign Application Priority Data

Mar. 22, 2012   (DE) .......................... 10 2012 204 579

(51) Int. Cl.  
*H05B 37/02*    (2006.01)

(52) U.S. Cl.  
CPC ........ *H05B 37/0272* (2013.01); *H05B 37/0227* (2013.01); *Y02B 20/44* (2013.01); *Y02B 20/48* (2013.01)

(58) Field of Classification Search  
CPC ........... H05B 33/0815; H05B 33/0827; H05B 37/0227; H05B 37/0272; H05B 37/029  
USPC ......................................................... 315/297  
See application file for complete search history.

(56) References Cited

U.S. PATENT DOCUMENTS

2010/0201267 A1 *   8/2010   Bourquin et al. ............... 315/32

FOREIGN PATENT DOCUMENTS

| DE | 196 25 197 | 6/1996 |
|---|---|---|
| DE | 196 25 197 A1 | 1/1998 |
| EP | 1 251 721 A1 | 4/2001 |

(Continued)

OTHER PUBLICATIONS

CM11A.pdf from CK11A ActiveHome Home Automation System Owner's Manual (Dec. 17, 1999, Document Properties), download from http://www.authinx.com/manuals/X10/CM11A.pdf.*  
Search Report issued by EPO for corresponding European Patent Application 13 15 577.7.  
Search report attached to the office action of the Chinese Patent Office for related Chinese patent application 201310090559.3, issued Sep. 12, 2014, with partial translation.

*Primary Examiner* — John Poos  
*Assistant Examiner* — David Mattison  
(74) *Attorney, Agent, or Firm* — Juneau & Mitchell

(57) ABSTRACT

The invention relates to an intelligent lighting device with multiple luminaires, which are at least partially coupled to each other with a wireless communication device. For this purpose, the luminaires preferably have communication modules with transmitter/receiver devices, via which the luminaires can communicate with each other. It is thereby provided that in accordance with the current operating mode of one of the luminaires at least one of the other luminaires can adopt a different predefined operating mode. Said luminaire can, for example upon the switching on of a luminaire or when one of the luminaires detects a person by means of a sensor device in the area of the luminaire, go into a working level with a predefined light intensity and the other luminaires located in the vicinity of said one luminaire go into a background illumination, i.e. in an illumination with a lower illumination level (background level).

18 Claims, 24 Drawing Sheets

(56) References Cited

FOREIGN PATENT DOCUMENTS

| | | |
|---|---|---|
| EP | 1 251 721 A1 | 10/2002 |
| GB | 2 475 724 A | 6/2011 |
| WO | WO 03/098 977 A1 | 5/2003 |
| WO | WO 03/098977 A1 | 11/2003 |
| WO | WO 2011/053 132 A2 | 10/2010 |

OTHER PUBLICATIONS

"Alone at Work" lighting device. See, 222.regent.ch.
"Swarmcontrol" lighting device. See, www. zumtobel.com.
"lightdim connect" and "lightdim smart" lighting devices. See, ww.tobais-grau.com.

\* cited by examiner

INTELLIGENT LIGHTING DEVICE WITH MULTIPLE LUMINAIRES, IN PARTICULAR FREE-STANDING LUMINAIRES OR DESK-MOUNTED LUMINAIRES AND A METHOD FOR OPERATING A LIGHTING DEVICE OF THIS TYPE

CROSS REFERENCE TO RELATED APPLICATIONS

This patent application claims priority to German Patent Application 10 2012 204 579.1, filed on Mar. 22, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

Intelligent lighting devices are known. Thus, for example DE 10 2006 057 755 A1 describes a controllable lighting system, which is time-dependently controlled depending on daylight or in accordance with a movement of persons or animals located in the area of the lighting system. In addition, a control of the lighting system is described, in which, depending on the position of the person, individual luminaires or luminaire groups are dimmed back or switched off if no user is in the room. Using a status message about presence or using the lack of a status message about the presence of persons or animals, corresponding control commands for the entire lighting system are generated. DE 10 2006 057 755 A1 does not disclose how this is supposed to occur in detail.

EP 20 48 916 B1 describes a different intelligent luminaire system. There, a plurality of luminaires is connected to operating and/or sensor elements via a wire-connected luminaire network. It is essential for this luminaire network that each of the luminaires is equipped with a single or multicore information signal line, which is integrated into the electrical supply bar and is therefore a component of the common power supply device. By this means it is possible that each of the luminaires can transmit information to the remaining luminaires. By this means, each luminaire can, when a control and/or sensor element directly assigned thereto triggers a control signal, convert said control signal not only for itself to control the illuminant, but can also communicate said control signal to the other luminaires of the network via the wire-connected information transmission channel. The information signal line is designed in particular as a one-wire or multi-wire bus.

What is needed is a luminaire system that avoids individual light islands during use of workstation-oriented illumination (i.e. individually switched on luminaires), while also offering simple installation and high variability.

2. Background of the Invention

The current state of knowledge is as follows.

The invention relates to an intelligent lighting device with multiple luminaires, in particular free-standing luminaires or desk-mounted luminaires, which are coupled at least partially with each other via a communication device.

A problem for wire-connected, intelligent lighting devices of this type is the fact that a relatively high installation cost is necessary, which becomes greater the more luminaires are supposed to be integrated into the entire lighting system. In addition, a change of the lighting system, i.e. a conversion of the individual luminaires, in e.g. open-plan offices, is difficult. In addition, a particular wire-connected communication channel must be provided in order to enable an intelligent lighting system of this type at all.

The aim of the present invention consists in specifying an intelligent lighting device, which is easy to install and distinguishes itself by a high flexibility. Further, the intelligent lighting device should create a more pleasant work atmosphere in that so-called light islands, in which only individual luminaires radiate light in open-plan offices, are avoided. The intelligent lighting device so identified should be distinguished by a high level of operating comfort during installation as well as in operation.

BRIEF SUMMARY OF THE INVENTION

In a preferred embodiment, an intelligent lighting device comprising multiple luminaires, which are at least partially coupled to each other with a communication device, further comprising a wireless communication device via which the luminaires at least partially communicate with each other, wherein in accordance with the current operating mode of one of the luminaires at least one of the other luminaires adopts a different predefined operating mode.

In another preferred embodiment, the disclosed intelligent lighting device, further comprising wherein each of the luminaires has the following operating modes:
luminaire is off (off),
luminaire is on at a background illumination (background level),
luminaire is on at maximum predefined light intensity (working level), and/or
luminaire is on at maximum possible light intensity (cleaning level).

In another preferred embodiment, the disclosed intelligent lighting device, further comprising wherein the background level and/or the working level can be adjusted.

In another preferred embodiment, the disclosed intelligent lighting device, further comprising wherein each of the luminaires is assigned to a predefined area with an area address.

In another preferred embodiment, the disclosed intelligent lighting device, further comprising wherein the predefined area is assigned with the area address of a different floor and/or a different room within a building.

In another preferred embodiment, the disclosed intelligent lighting device, further comprising wherein each of the luminaires is assigned to one, preferably two or more groups, wherein each group has its own group address.

In another preferred embodiment, the disclosed intelligent lighting device, further comprising wherein the groups assigned to a luminaire overlap.

In another preferred embodiment, the disclosed intelligent lighting device, further comprising wherein the area address and/or at least group address can be entered manually at a luminaire via mechanical switch devices.

In another preferred embodiment, the disclosed intelligent lighting device, further comprising wherein the luminaires belong to a group of luminaires, which luminaires are arranged directly adjacent to each other.

In another preferred embodiment, the disclosed intelligent lighting device, further comprising wherein the luminaires are equipped at least partially with a sensor device, wherein upon detection of a person in the sensor area the respective luminaire (presence detection) switches on.

In another preferred embodiment, the disclosed intelligent lighting device, further comprising wherein that during manual switching on of a luminaire or upon presence detection at one luminaire, said luminaire can be switched on to working level and the other luminaires belonging to the same group and to the same area either receive wireless communication from the switched-on luminaire or detect autonomously and go into background level, provided the other luminaire or the other luminaires are not already switched to working level.

In another preferred embodiment, the disclosed intelligent lighting device, further comprising wherein that the state of a luminaire which is at working level, can be communicated at intervals to the other luminaires, preferably at 10- to 20-second intervals.

In another preferred embodiment, the disclosed intelligent lighting device, further comprising wherein that switching off one luminaire is detectable by the other luminaires belonging to the same area and to the same group.

In another preferred embodiment, the disclosed intelligent lighting device, further comprising wherein that a shutoff delay of multiple minutes is provided, in particular 5 to 30 minutes, preferably approximately 10 minutes, and the lack of a presence detection is only communicable to the other luminaires in the same group and in the same area after the expiration of said shutoff delay.

In another preferred embodiment, the disclosed intelligent lighting device, further comprising wherein that a manually actuatable switch device is provided, via which all luminaires or all luminaires of an area or all luminaires of one or more groups can be wirelessly switched off or can be switched on at the maximum light intensity (working level).

In another preferred embodiment, the disclosed intelligent lighting device, further comprising a manually actuatable switch device, via which at least one luminaire can be switched on and/or can be dimmed to working level.

In another preferred embodiment, the disclosed intelligent lighting device, further comprising wherein the wireless communication device has individual communication modules, which are arranged preferably replaceably on or in the luminaires.

In another preferred embodiment, the disclosed intelligent lighting device, further comprising wherein the manually actuatable switch devices for specifying the area address and/or group address are arranged in the communication modules.

In another preferred embodiment, the disclosed intelligent lighting device, further comprising wherein the luminaires are free-standing luminaires or desk-mounted luminaires.

In another preferred embodiment, a method for operating a lighting device with multiple luminaires which are at least partially coupled to each other with a communication device, characterized in that the luminaires communicate wirelessly at least partially with each other and in accordance with the current operating mode of one of the luminaires at least one of the other luminaires adopts a different predefined operating mode.

Figure 1:
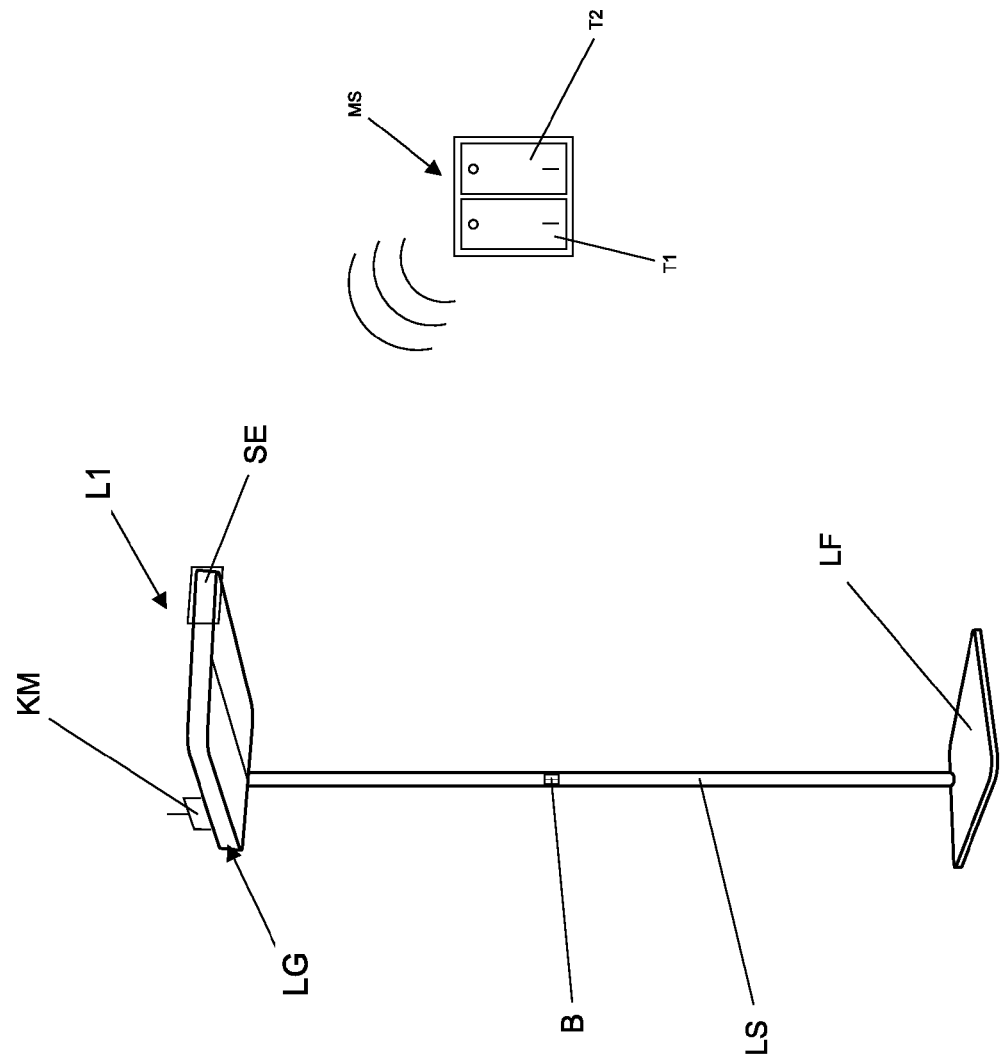
FIG. 1 is a line drawing evidencing an embodiment of a free-standing luminaire according to the invention having manual switch devices for activating said free-standing luminaire.

Each of FIGS. 6 to 24 is a schematic drawing comprising a different schematic depiction of an open-plan office having a plurality of workstations, to which respectively paired working luminaires are assigned each in different operating modes of the entire lighting device.

DETAILED DESCRIPTION OF THE INVENTION

The invention relates to an intelligent lighting device with multiple luminaires, in particular free-standing luminaires or desk-mounted luminaires, which are coupled at least partially with each other via a communication device.

Accordingly, the intelligent lighting device has a wireless communication device, via which the luminaires communicate at least partially with each other, wherein in accordance with the current operating mode of one of the luminaires at least one of the other luminaires adopts a different, predefined operating mode. The wireless communication device is thereby particularly advantageous, which preferably is equipped with a transmitter/receiver device at each of the luminaires, so that each of the luminaires can communicate its own operating status to the other luminaires or to a part of said other luminaires, or the operating status thereof can be detected by the other luminaires. The preserving of wire-connected and therefore fairly inflexible communication channels between the luminaires is therefore no longer necessary, which significantly facilitates the installation of the luminaires or the set-up of the luminaires in open-plan offices. The individual luminaires must merely be connected at suitable sockets to the electrical supply, provided said luminaires are not equipped with their own electrical supply, e.g. with a battery or an accumulator.

The preferred operating modes of the luminaires are, among others, as follows:
  Light is off ("off"),
  Light is on at a background illumination ("background level"), and
  Light is on at maximum predefined light intensity ("working level").

The background level and/or the working level are thereby adjustably selected by an operator.

The working level is thereby designated by that operating status of a luminaire, at which the luminaire radiates such a quantity of light that it enables a pleasant working environment beneath or in the area of said luminaire. Background lighting is understood as an illumination level lower than this, at which the luminaire radiates a lower quantity of light, which can be likewise previously set, thus no work has to take place in the direct area of this luminaire. The background level can e.g. be set to half the light quantity of the working level. In the "off" operating status, the luminaire is still connected to the electrical supply, however it is switched off so that said luminaire radiates no light.

It is possible using these different operating modes that upon manually switching on one luminaire, this luminaire radiates light at the working level and the other luminaires located directly adjacent go into the "background level" operating mode such that a lower light level prevails around the luminaire operating at the working level, and thereby a spot-like light island, which would be created by the sole light radiation of a single luminaire, is avoided.

It is not mandatory to configure the communication between the individual luminaires such that the luminaire going into the working level communicates to the other luminaires located in the vicinity that said luminaire was switched on at the working level. It is instead also within the context of the invention that the luminaires each "observe" the other luminaires located in the vicinity and then go into a predefined operating mode if an "observed" luminaire has adopted a specific operating mode. If, for example, one of the luminaires goes into its working level, because said luminaire was e.g. manually switched on by an operator, the other luminaires located in the vicinity detect this status and switch on in their "background level," provided they are not already at the working level.

Instead of the manual switching on of a luminaire, it can also be provided that the luminaires are each equipped at least partially with a sensor device, wherein upon detecting a person in the sensor area of the respective luminaire, said luminaire is switched on to the working level. This is designated in the following as "presence detection." A sensor device of this type can function thereby using ultrasonics, infrared detection (e.g. by means of passive infrared sensors), radar or something similar.

It has proven to be advantageous to assign each of the luminaires of a predefined area with an area address. A predefined area with an area address of this type can for example be assigned to a specific floor and/or to various rooms within a building.

It is further appropriate that each of the luminaires is assigned to one, preferably two or more, groups, wherein each group has its own group address. A group can for example be defined such that a specific luminaire, as well as the other luminaires located directly adjacent to this light, always belong to a group. It is therefore within the context of the invention that predefined groups of this type can overlap.

In addition, it has been proven to be advantageous that mechanical switch devices, in particular rotary switches, are provided, by means of which the area addresses and/or group addresses can be manually set at each of the luminaires by an operator. It is thereby particularly simple to locate said mechanical switches, with the associated electronics, in the transmitter/receiver module of the communication device in each luminaire, preferably retrofittably or replaceably, so that in the case of a failure of a communication module of this type, only this module must be replaced at the respective luminaire.

It has proven beneficial if the communication device communicates with the transmitter/receiver modules located in the individual luminaires, such that each of the luminaires observes the other luminaires. If one of the luminaires goes into its working level due to being manually switched on or due to presence detection, then the other luminaires located in the direct vicinity thereto detect this and go into their background level, provided that they are not already themselves switched on at the working level. This "observation" of the other luminaires has the advantage that the luminaires can operate independently among each other so that redundant communication is avoided.

It is provided in a further development of the invention that the status of a luminaire, which is in the operating status, can be communicated at intervals to the other luminaires, or in an alternative embodiment is queried at intervals by the other luminaires belonging to the same group, preferably at 10- to 20-second intervals. This interval-based communication has the advantage that relatively little energy is consumed and, in spite of that, the current operating status of the luminaires is available relatively quickly to the other luminaires. In addition, by this means an autarchic automatic shutdown is possible in the case of loss of communication.

In a further development of the invention, a shutoff delay of multiple minutes is provided, in particular 5 to 30 minutes, preferably approximately 10 minutes. If no presence detection occurs within this shutoff delay by the luminaire, thus if no person is detected in the operating area of the luminaire, then this leads, only after expiration of this shutoff delay at the other luminaires in the same group and in the same area, to switching from the operating mode "background level" into the operating state "off," provided that the respective luminaire does not remain in the background level due to other events or even must switch to working level. This is achieved in that the luminaire in the working level communicates at intervals during the operating mode "working level" and during the shutoff delay, in which it is likewise still at working level, to the other luminaires with the same area or group address, that said luminaire is still at working level. The luminaires, which are in a different operating mode than "working level," do not transmit presence messages of this type.

It lies within the context of the invention that a manually actuatable switch device is provided, via which each luminaire can be individually switched on and/or is dimmable to the working level thereof and/or to the background level thereof. A manually actuatable switch device of this type can in principle be firmly mounted to each of the luminaires. It is, however, also within the context of the invention to place a manually actuatable switch device of this type at a distance from the respective luminaire and to provide a corresponding preferably wireless communication with the respective luminaire. Using a manually actuatable switch device of this type, which preferably has two buttons, the on and off switching of the luminaires and also the corresponding dimming process can be realized.

Using a manually actuatable switch device of this type or another, according to the invention a part of the luminaires of an area or all luminaires of one or more groups or all luminaires of the intelligent lighting device can be switched off or switched on to a maximum possible light intensity that lies above the working level. A switching on of all luminaires is for example necessary if a cleaning crew is cleaning in an open-plan office.

The maximum possible illumination is designated in the following as "cleaning level."

It should be noted thereby that each luminaire can be individually connected to one or more external switch devices. This is not dependent on group or area. Using a switch again any number of luminaires can be switched.

As mentioned, cleaning level means 100% of the possible light intensity of the luminaires. This goes automatically after a predefined time, e.g. after 60 minutes, back into the operating mode "off" if this does not occur previously due to another user-defined entry (e.g. via a switch device).

The cleaning level in the luminaire or in the luminaires can only be activated via external switch devices.

The intelligent lighting device according to the present invention is specified in particular for free-standing luminaires or desk-mounted luminaires; however, it is also suitable for any other kind of luminaires.

DETAILED DESCRIPTION OF THE FIGURES

Turning now to the figures, provided nothing else is specified, the same references designate the same parts with the same meaning in each figure.

FIG. 1 shows a luminaire L1 which is designed as a free-standing luminaire and has a luminaire base LF, a luminaire rod LS, and a luminaire housing LG located on the upper end of the luminaire rod LS. The illuminants of the luminaire L1 are located in the lighting housing LG. The illuminants in the luminaire housing LG can be switched on and/or dimmed by an operator via a conventional manual switch device, which for example is fixed to the luminaire rod LS and is designated with the reference B. In addition to this operating possibility a further manual switch device MS having two buttons T1 and T2 is depicted in FIG. 1, which switch device is not directly mechanically connected to the luminaire L1, but rather is fixed to another point e.g. to a wall of a room and communicates wirelessly with the luminaire L1 in order to switch on and/or also to dim the luminaire L1. This manual switch device MS transmits the switch or control functions wirelessly to luminaire L1 which has a suitable communication module KM for this purpose. The communication can for example take place according to the system as it is described in DE 10 2006 061 705 A1 or DE 10 2007 037 895 A1 from Enocean GmbH.

In addition, the luminaire L1 from FIG. 1 is equipped with a sensor device SE for presence detection, whether a person remains in the sensor area of the luminaire L1 or approaches this sensor area.

Figure 2:
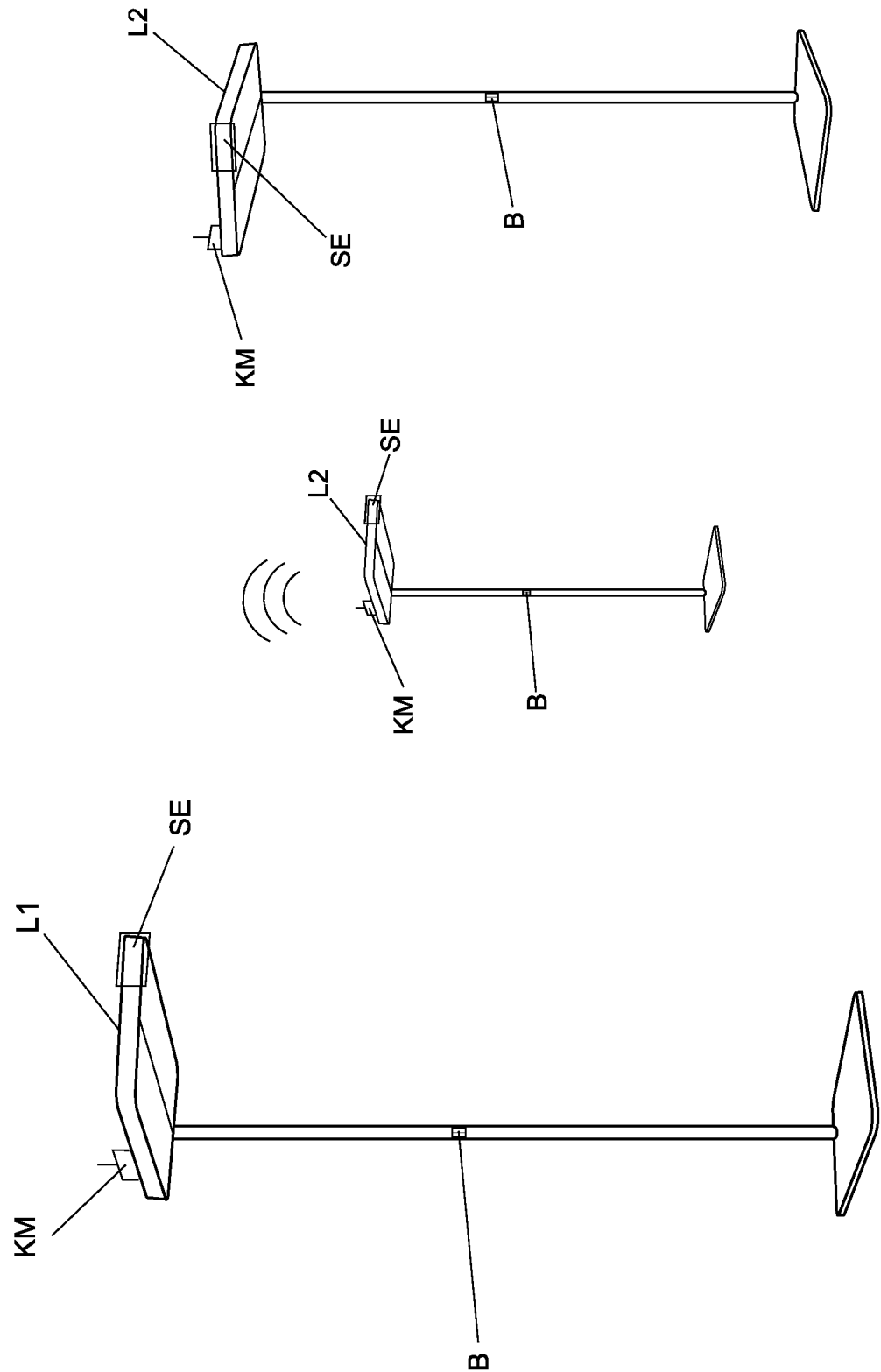
FIG. 2 is a line drawing evidencing a group of three free-standing luminaires according to FIG. 1.

FIG. 2 depicts three free-standing luminaires L1, L2, and L3 within a room. Each of these three luminaires L1, L2, and L3 is equipped with a communication device KM which enables the luminaires L1, L2, and L3 to wirelessly communicate with each other such that according to the requirement or current operating mode of one of the luminaires, e.g. luminaire L2, the other two luminaires L1 and L3 are autonomously adjustable into a predefined different operating mode.

It is hereby assumed that the three luminaires L1, L2, and L3 can be operated at three different operating modes. A first operating mode consists in that the respective luminaire L1, L2, or L3 is switched off and thus adopts the operating mode "off." A second operating mode is provided in that the respective luminaire L1, L2, or L3 illuminates with a maximally defined, individually adjustable light intensity. This operating mode is designated as "working level," during which in the area of the luminaire a desired light quantity is radiated from this luminaire in order to enable optimal labor. A third operating mode consists in that the respective luminaire illuminates at a background illumination, i.e. at an illumination that is lower than the working level. This third operating mode is designated as "background level."

If it is assumed that an operator switches on luminaire L2 in FIG. 2 or that an operator approaches the luminaire L2 such that the sensor device SE detects said person, then luminaire L2 switches on in order to illuminate at the working level. This illumination at the working level of luminaire L2 is detected by the two remaining luminaires L1 and L3, either in that the communication device KM of the luminaire L2 transmits this to the communication device KM in the luminaires L1 and L3, or in that the communication device KM in the luminaires L1 and L3 detects this status of the luminaire L2 at the communication device KM of luminaire L2. The information that the luminaire L2 illuminates at the working level leads, based on the communication that took place, to the fact that the two luminaires L1 and L3, which according to conditions stand in the vicinity of the luminaire L2 and belong to an as yet to be explained group of luminaire L2, autonomously switch on from their operating mode "off" into the background illumination and thus into the background level.

The switching on of the luminaire L2 therefore leads to the fact that the two other luminaires L1 and L3 likewise illuminate, however at a different light intensity. Due to the switching on of the luminaires L1 and L23 to the background level, the total illumination of the room diminishes gradually into the depths of the room. On the whole, a more comfortable feeling of illumination is generated in the environment around luminaire L2 by this means than would be the case if the luminaire L2 were to individually illuminate and thus function as a light island. Using the described arrangement, a more pleasant spatial feeling is created when the illumination in the room does not change abruptly from light to dark, as would be the case if only the luminaire L2 were to illuminate.

Figure 3:
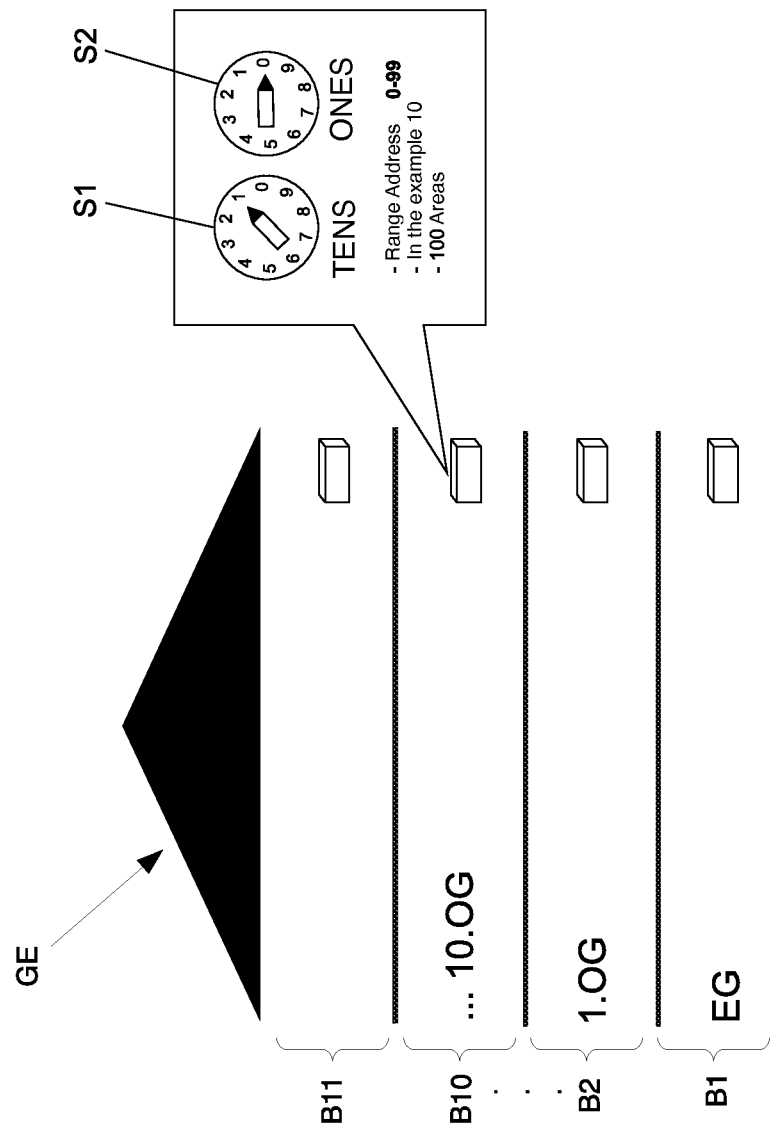
FIG. 3 is a schematic drawing evidencing a view of a building having various floors and free-standing luminaires located there having communication modules for area assignment.

It was assumed in conjunction with FIG. 3 that the three luminaires L1, L2, and L3 correspond with each other via the communication modules KM thereof. Due to the use of a plurality of luminaires in a building it is, however, practical to group said luminaires in different areas or groups in order to avoid all luminaires communicating with each other. A sensible area and group assignment consists for example in grouping the respective luminaires in relation to floors or in relation to rooms within a building.

FIG. 3 depicts a multi-floored building GE of this type with 11 floors B1 ... B11. A plurality of free-standing luminaires is located on each of the floors B1 ... B11, whereby FIG. 3 schematically depicts only a communication module KM of said luminaires as a proxy for a luminaire on each floor. Manual switches S1, S2, which are designed here as rotary switches, are respectively located in the communication modules KM in order to determine an area address. These two switches S1, S2 are depicted schematically in FIG. 3 in more detail for one of the communication modules KM on the tenth floor B10 of the building GE.

The two switches S1, S2 have respectively ten different settings 0 to 9 and can thus jointly determine 100 different area addresses. Using these area addresses, the free-standing luminaires are divided into regions within the building GE. Thus, for example the communication modules KM on the tenth floor B10 are set to the area address "10," in that the switch S1 is switched to "1" and the switch S2 to "0." On the ground floor B1, the switch S1 would be set at "0" and the switch S2 at "0." The first upper floor of the building GE would define a second area B2, in which the switch S1 is set at "0" and the switch S2 at "1" etc. Using the switches S1 and S2, areas B1 ... B11 are therefore assigned in the communication modules KM and thus for the different luminaires, which regions are assigned to the different floors of the building GE.

Figure 4:
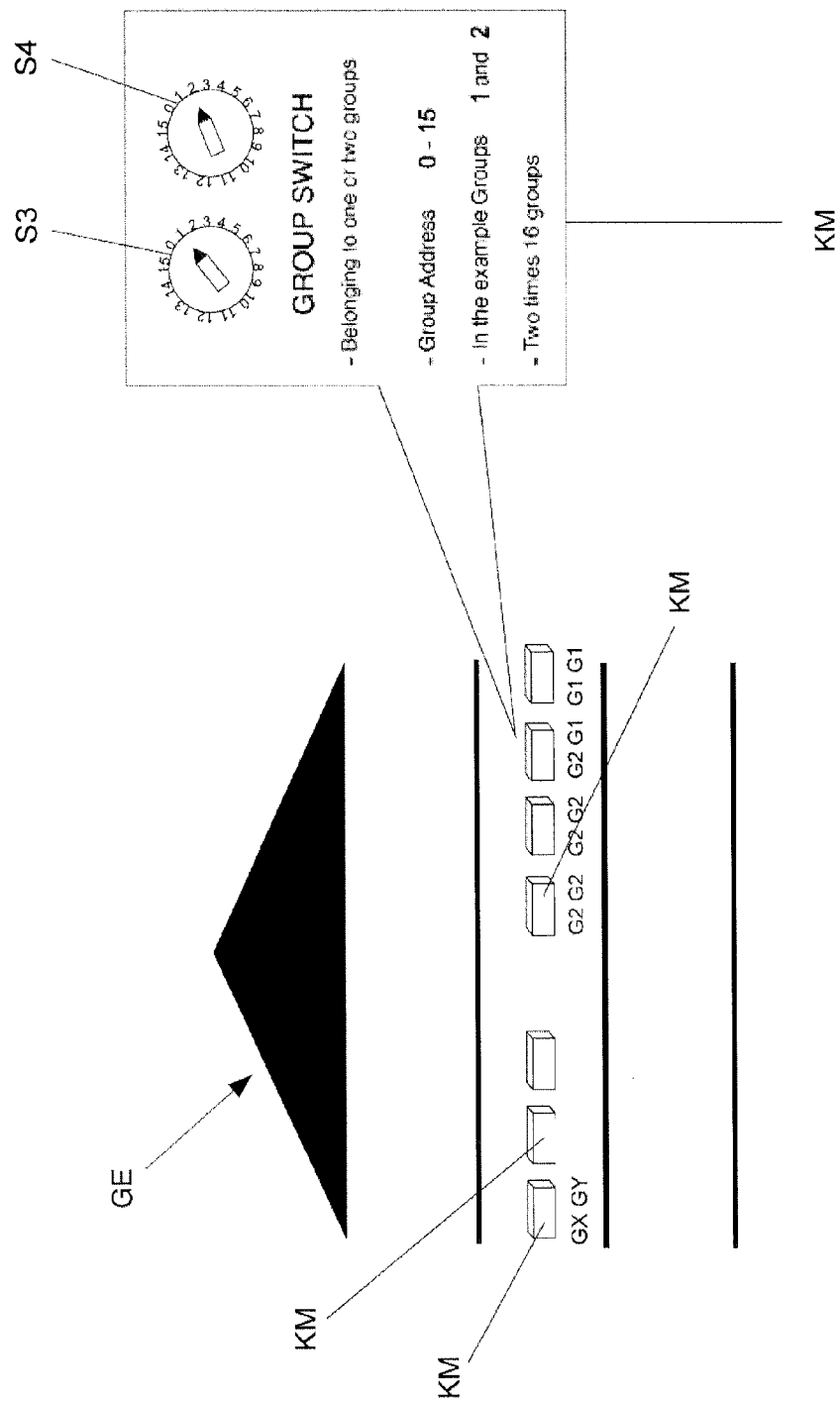
FIG. 4 is a schematic drawing evidencing a view of a building in which a group assignment of the luminaires in one floor occurs.

A further assignment is clear in conjunction with FIG. 4. This arrangement relates to different groups within a floor of the building GE, wherein these groups can be selected such that they are assigned to different rooms on the floor or to different areas within a room, in particular within an open-plan office. For this arrangement, further switches S3, S4 are integrated into the communication modules KM of the luminaires, by means of which group addresses can be determined. In the embodiment of FIG. 4, two manually actuatable switches S3, S4 are provided by means of which it is possible to assign a luminaire to two groups. The two switches S3, S4 are again preferably designed as rotary switches and equipped with 16 different switch settings. It is thereby possible to assign each luminaire to two different groups out of the total of 16 groups via the corresponding settings of the switches S3, S4 within the communication module KM. The switch S3 is switched into setting "1" in the enlarged depiction of the communication module KM of FIG. 4. Thus, the associated luminaire belongs to group 1. The switch S4 is set to setting "2," so that this luminaire is assigned not only to group "1" but also to group "2" and can therefore wirelessly communicate with group "1" as well as with group "2."

Figure 5:
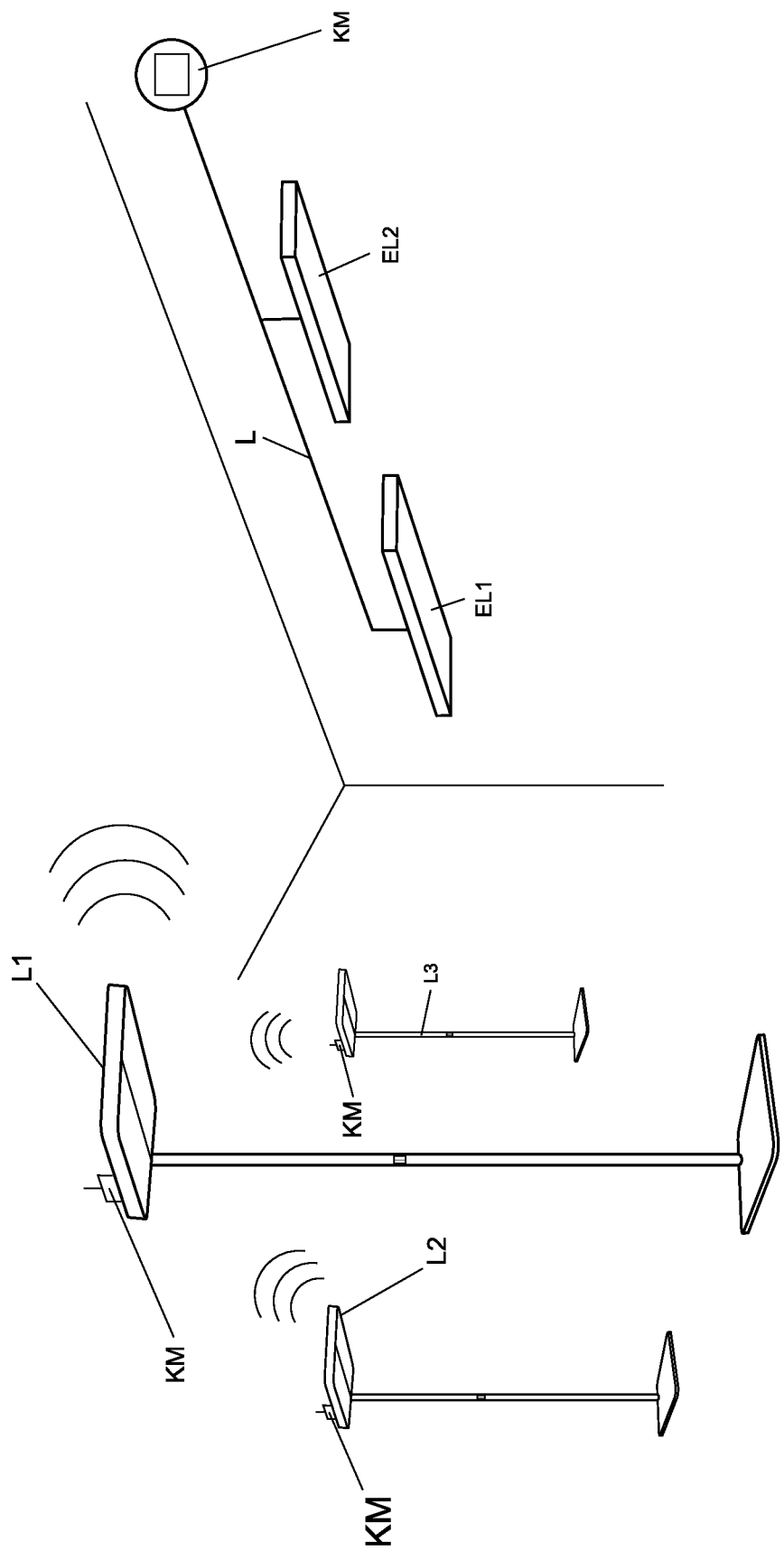
FIG. 5 is a line drawing evidencing the three free-standing luminaires from FIG. 2 with additionally provided wall and/or suspended luminaires.

FIG. 5 expands the lighting device from FIG. 2 with the three free-standing luminaires L1, L2, and L3 by two wall or suspended luminaires EL1, EL2. These two suspended luminaires EL1, EL2 are connected via an electrical line L with a further communication module KM, which is similar to the communication modules KM of the luminaires L1, L2, and L3. In the embodiment, said suspended luminaires EL1, EL2 are not equipped with their own switch device, so that these can only react passively to the illumination situation of the luminaires L1, L2, and L3. If, as is assumed in the embodiment from FIG. 2, the luminaire L2 is switched on by manual switching or presence detection into the working level, and if the two remaining free-standing luminaires L1 and L3 as well as the communication device KM or the two wall or suspended luminaires EL1 and EL2 are assigned to the group to which the luminaire L2, which is at working level, is allegedly assigned, then the wall or suspended luminaires EL1 and EL2 likewise illuminate at the background level. The same applies for the free-standing luminaires L1 and L3, provided these are not themselves illuminated at the working level.

It is, however, also possible that the two luminaires EL1, EL2 in FIG. 5 are not connected to a communication device KM, but instead to a normal, external switch actuator. This function can be activated or deactivated via a button at the communication module in the luminaires. During activated function, the luminaire functions like an external switch device. I.e., as soon as the luminaire goes from "off" to "on" (background level, working level, cleaning level), the switch information transmits "on." During the change to the operating mode "off," the switch information transmits "off."

The subsequent FIGS. 6 to 24 illustrate a typical illumination situation of an open-plan office with a plurality of workstations and working luminaires, when various persons enter or leave this open-plan office. It is thereby explained in a clear way how the previously conventional light islands can be effectively avoided.

Figure 6:
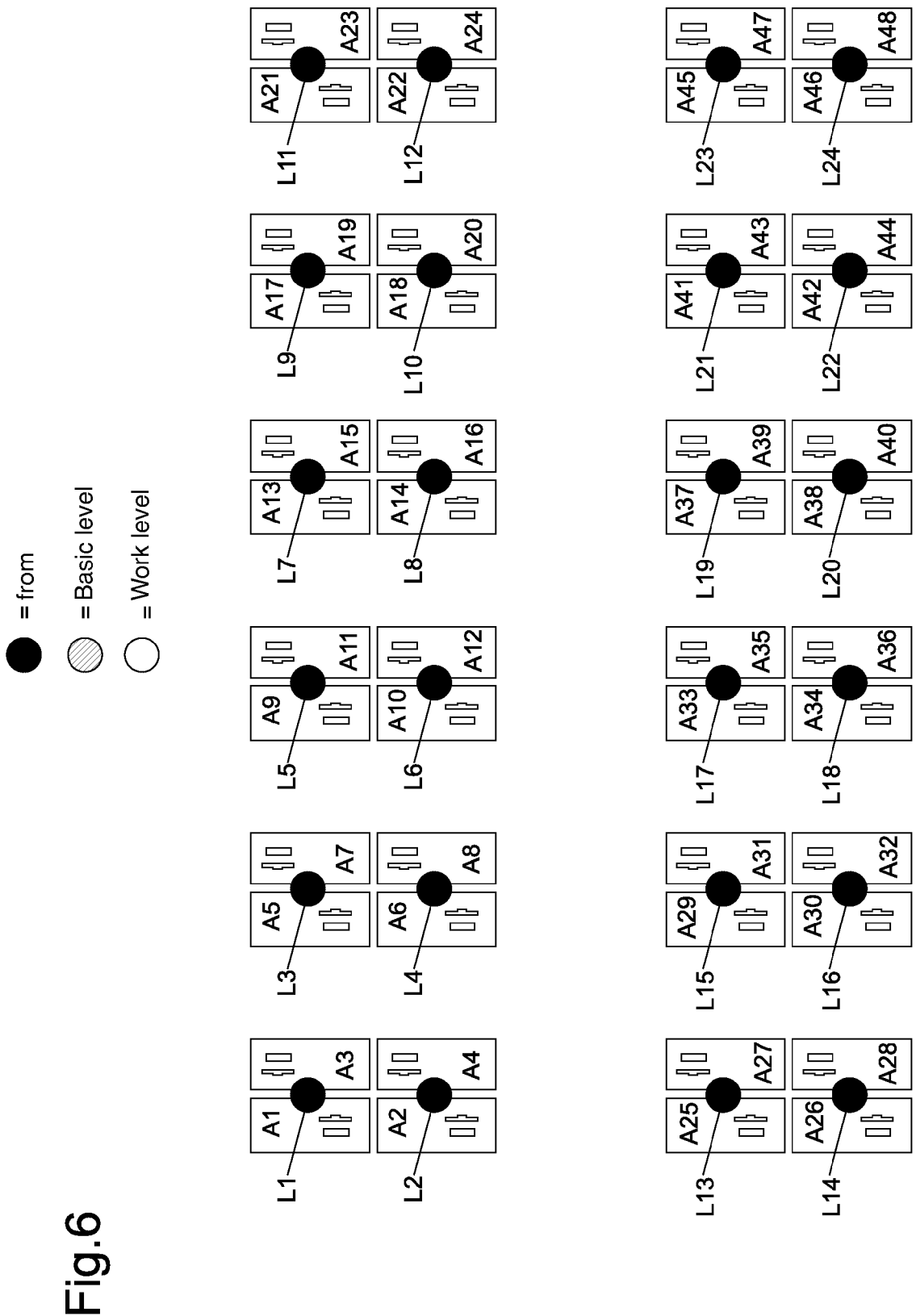

FIG. 6 depicts exemplarily an open-plan office or a hall with a total of 48 workstations A1 to A48, wherein each four workstations A1, A2, A3, A4 etc. stand next to and opposite each other in pairs. A luminaire L1, L2, etc. is located respectively between the front sides of two of the opposite workstations A1, A3; A2, A4. In the room depicted, a total of 24 luminaires L1 to L24 are located accordingly. All of these luminaires L1 to L24 are assigned to the same area and thus are provided with the same area address within the respective communication module. The previously mentioned switches S1, S2 are set for these luminaires L1 to L24 at the same position. In addition, the individual luminaires L1 to L24 are assigned in groups to each other. For this purpose, the corresponding switches S3, S4 (cf. for this purpose FIG. 4) in the communication modules are programmed to the corresponding group addresses. The groups are thereby determined such that, assuming that one luminaire determines a group, the other luminaires respectively grouped directly around said luminaire belong to the same group. By this means, groups can also overlap.

If one considers for example in FIG. 6 the luminaire L3 and one defines a group for said luminaire L3 as the first group G1, then the luminaires L1, L2, L4, L5, and L6 also belong to said first group G1 defined by the luminaire L3. The luminaire L5 can for example define a second group. In addition to luminaire L5, the luminaires L3, L4, L6, L7, and L8 located directly around the luminaire L5 belong to this group G5, etc.

There are no people in the room in the embodiment of FIG. 6. All luminaires L1 to L24 are in the operating mode "off." The luminaires can, however, be switched on into their working level and therefore illuminate at a maximum predefined light intensity. In addition, the luminaires L1 to L24 are suited to also illuminate at a background level with a lower light intensity.

Figure 7:
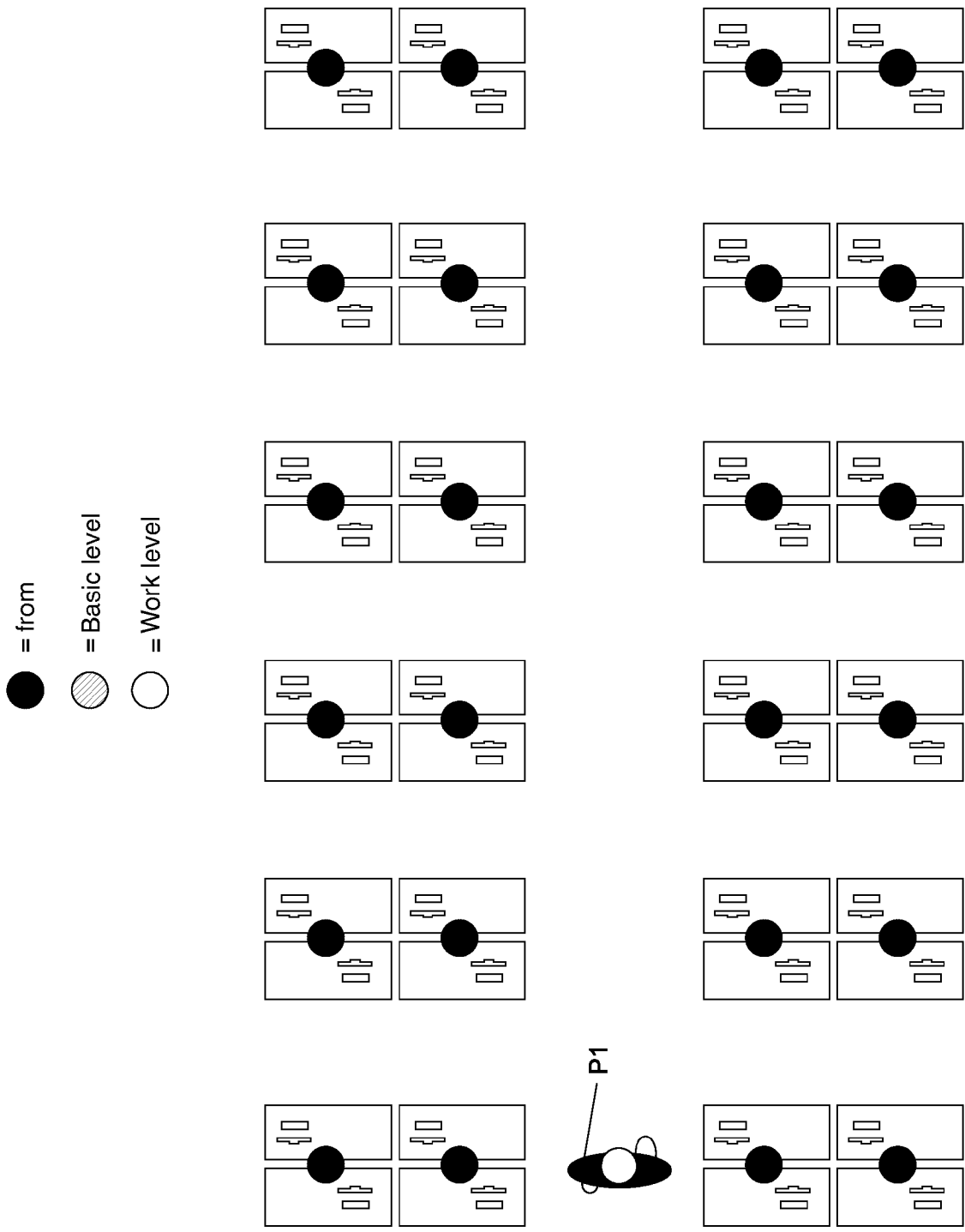
Figure 8:
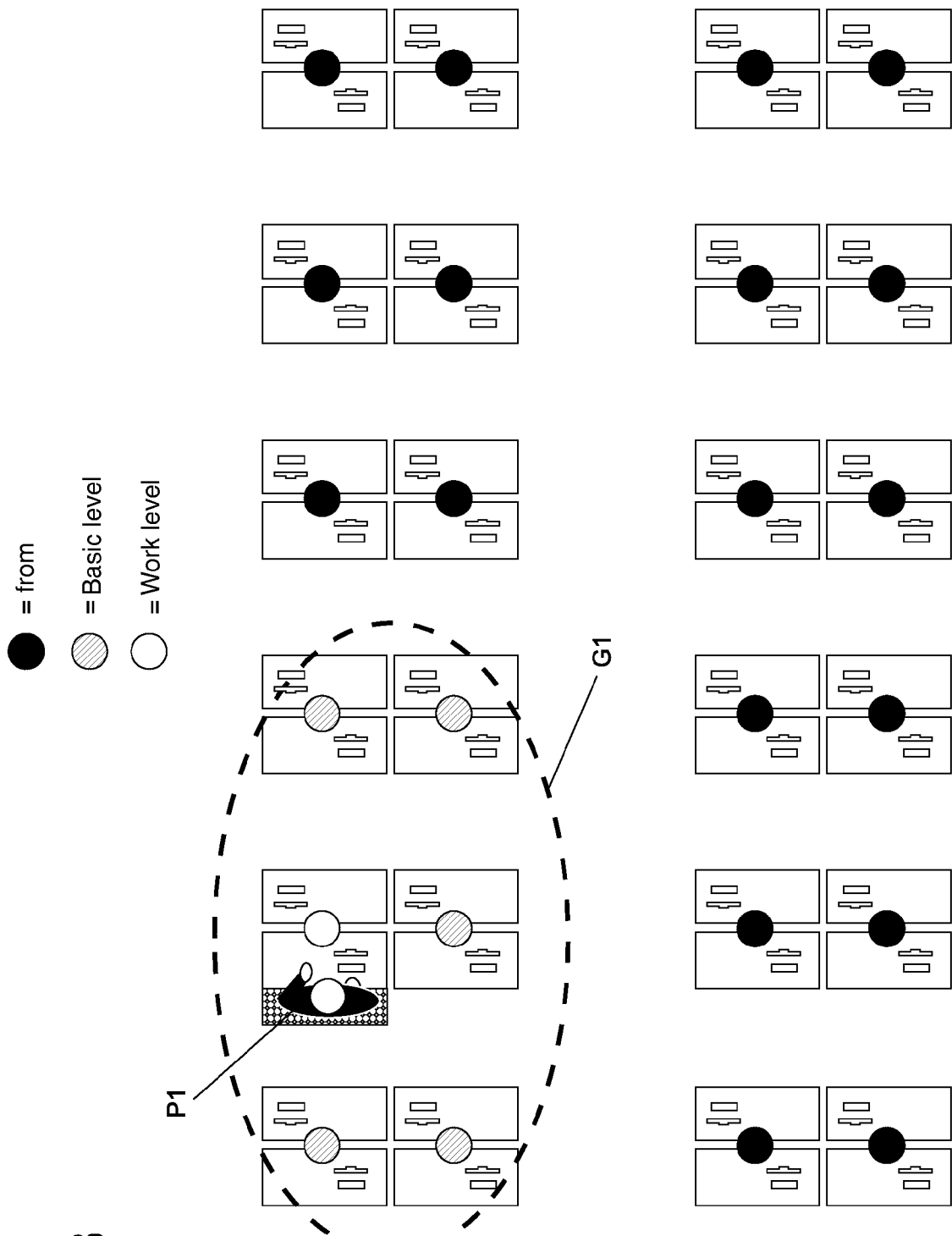

In FIG. 7, a first person P1 enters the hall area of the open-plan office in order to take a seat at workstation A5, as shown in FIG. 8. The luminaire L3 detects the person P1 and switches on to working level so that person P1 enjoys optimal illumination of the workstation. This switching on to working level is detected by the surrounding luminaires L1, L2, L4, L5, and L6, which belong to the same group G1, such that said luminaires switch on to background level.

Figure 9:
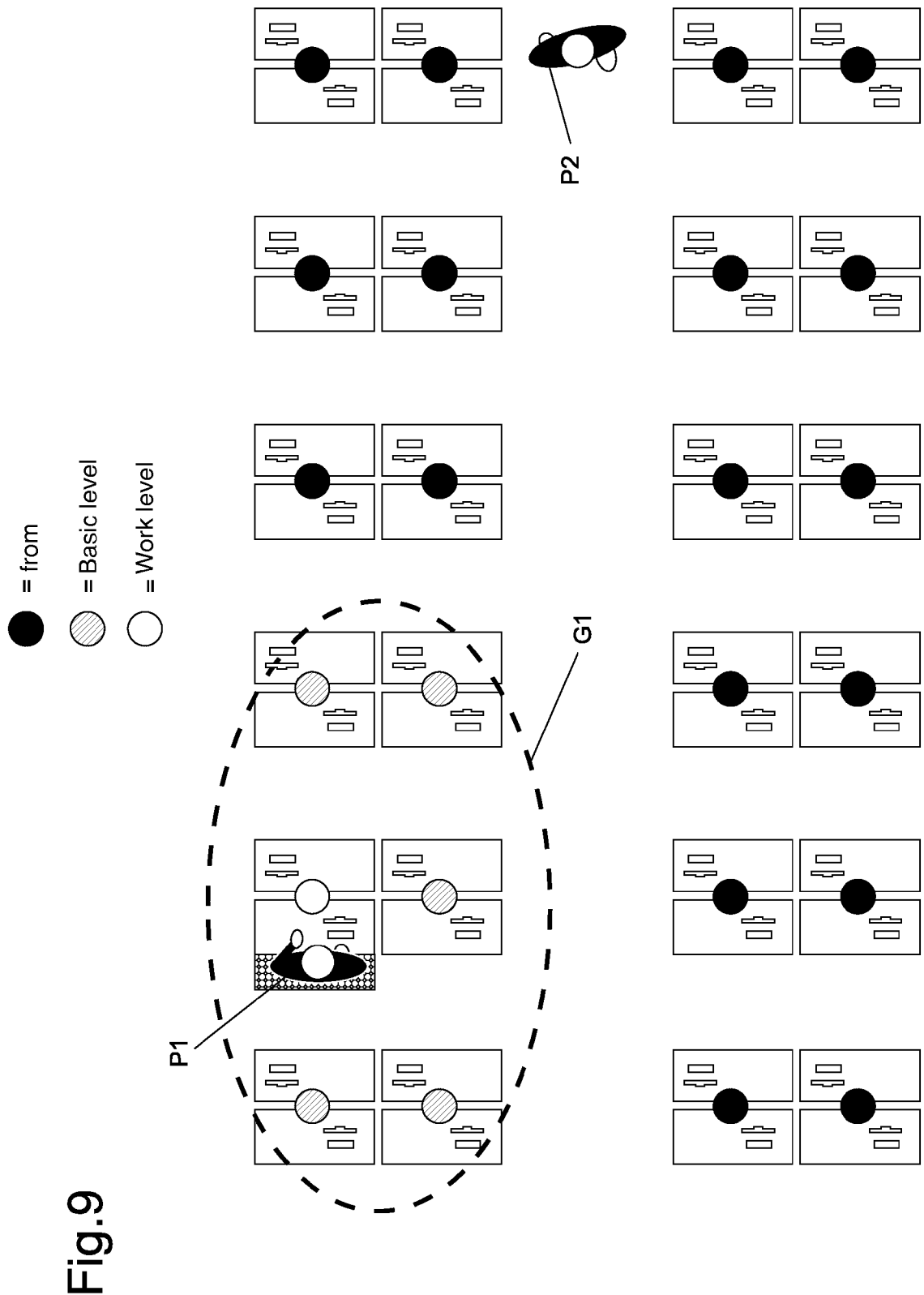
Figure 10:
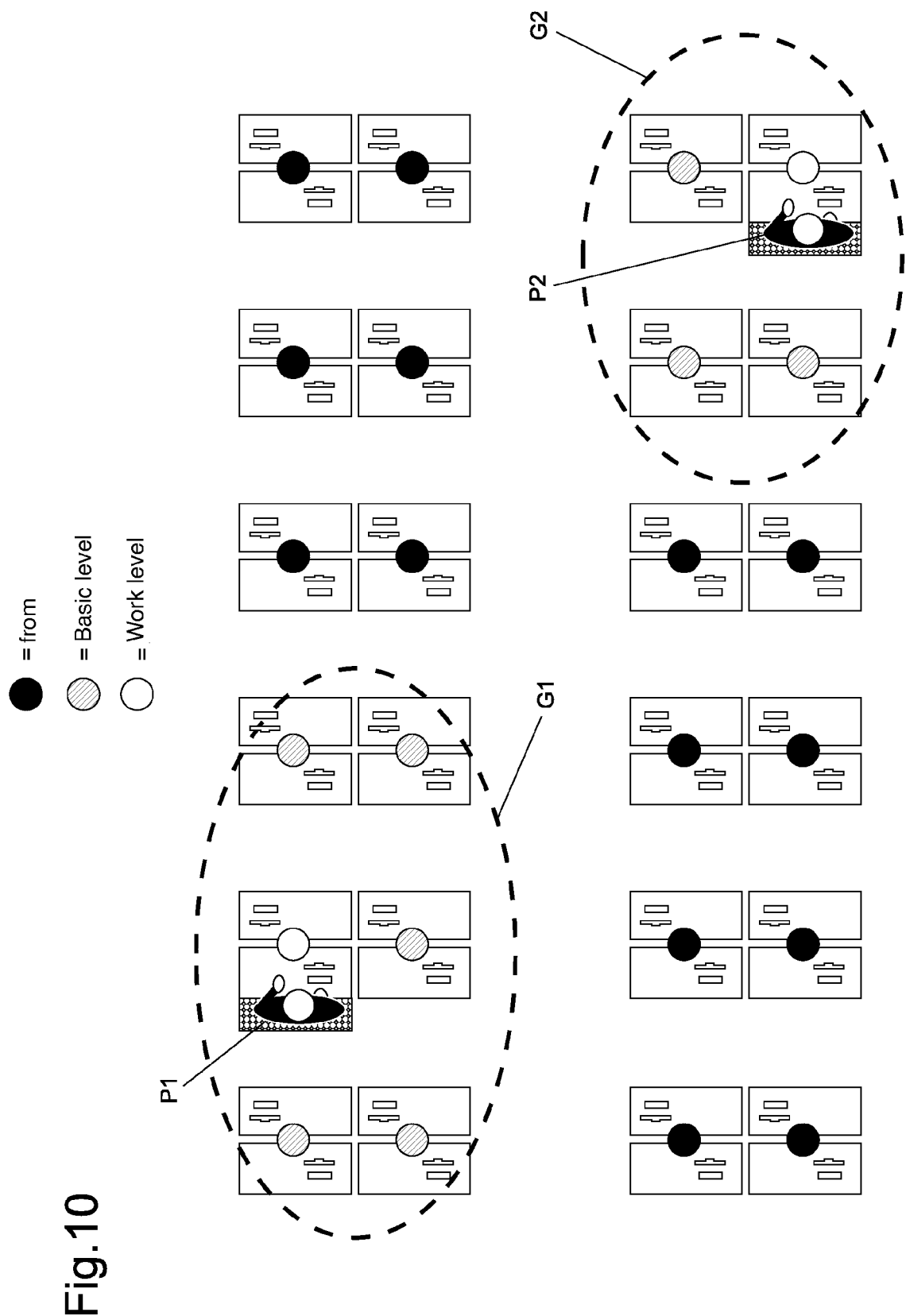

According to FIG. 9, a second person P2 approaches a workstation from the right. The person P2 enters the workstation A46 (compare FIG. 10), whereby luminaire L24 switches on to working level. This switching on to working level is detected by luminaires L21, L22, and L23 which are directly in the vicinity, or this is communicated to the same, whereby said luminaires L21, L22, and L23 located in group G2 switch on to the background level.

Figure 11:
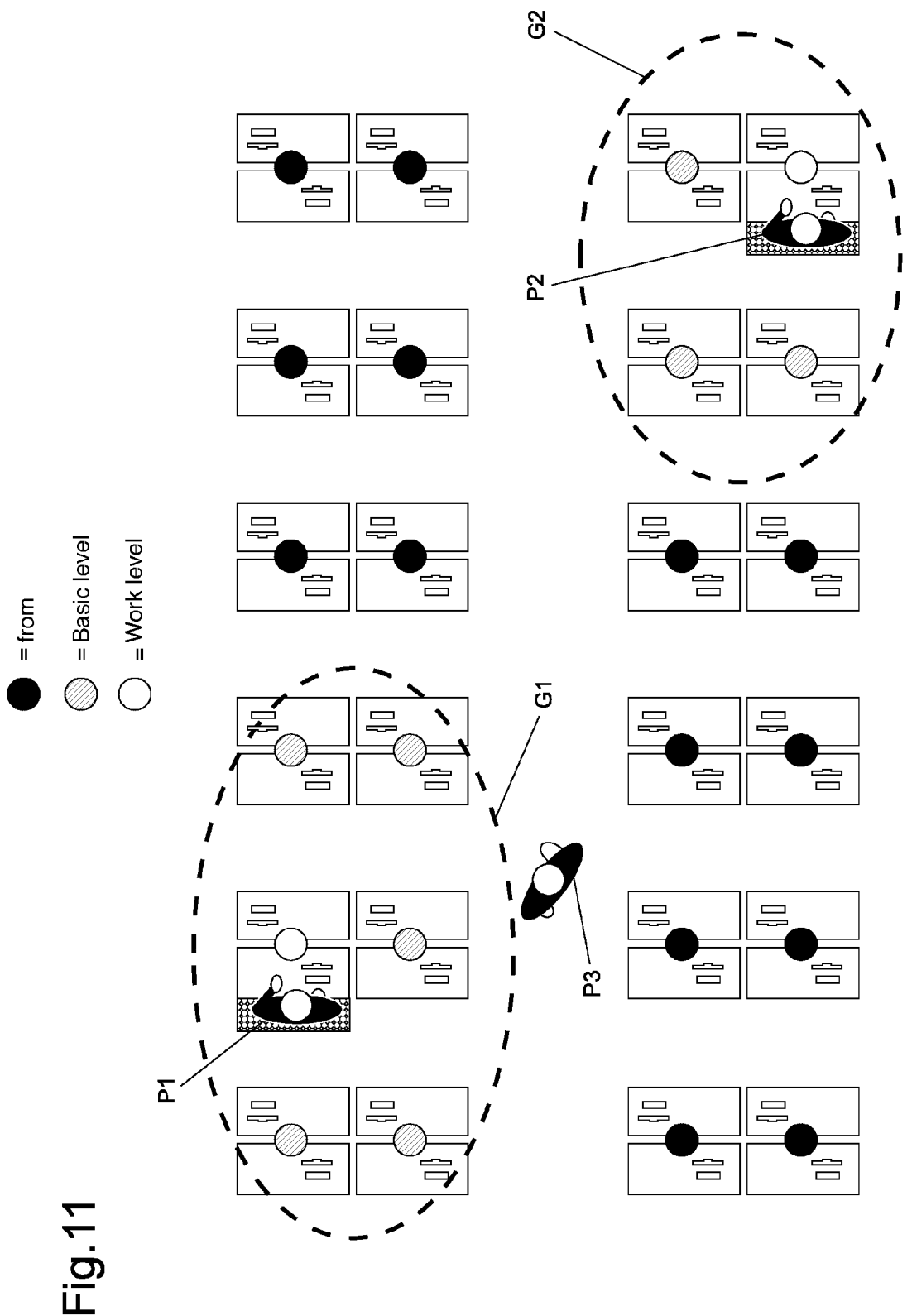
Figure 12:
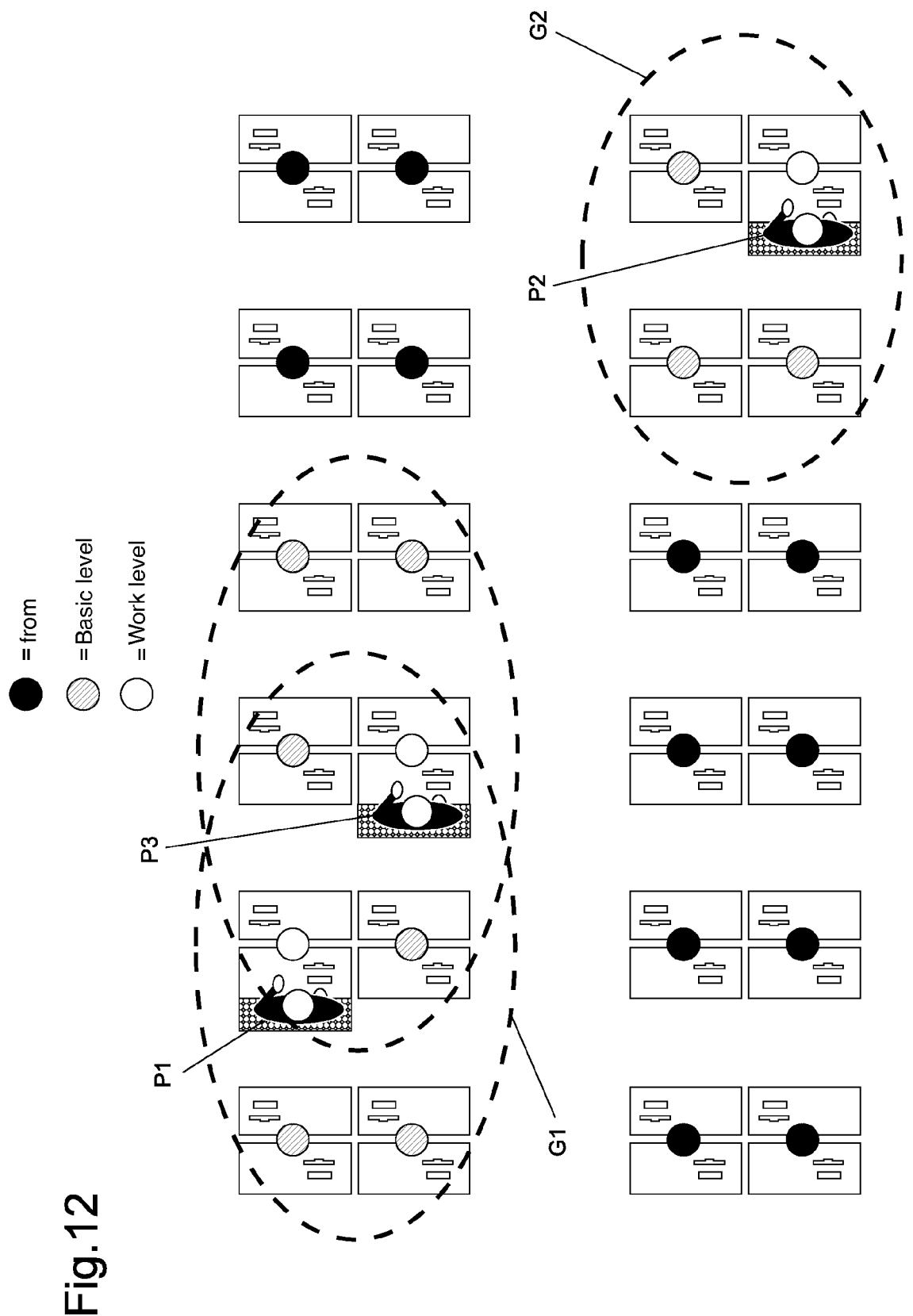

In FIG. 11, a further person P3 enters and sits at workstation A10 according to FIG. 12. The luminaire L6 belonging to workstation A10 switches from background level to working level, which leads, according to FIG. 13, to the fact that the other luminaires located in the direct vicinity of luminaire L6 are informed that luminaire L6 is at working level. The luminaires L4, L5 are already at background level and do not change operating mode. However, luminaires L7 and L8 switch on to background level, as said luminaires belong to group G3, which is defined by luminaire L6.

Figure 13:
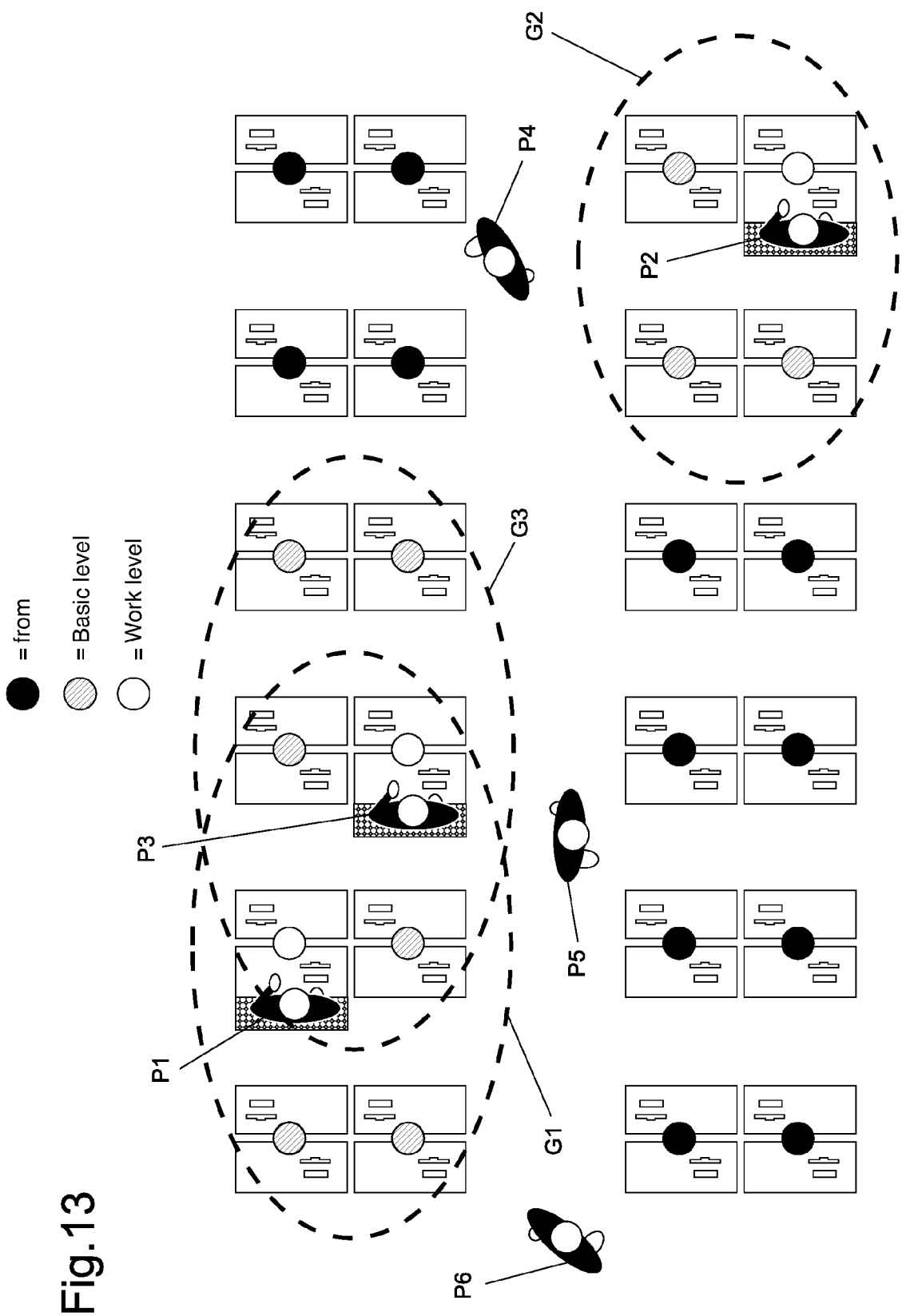
Figure 14:
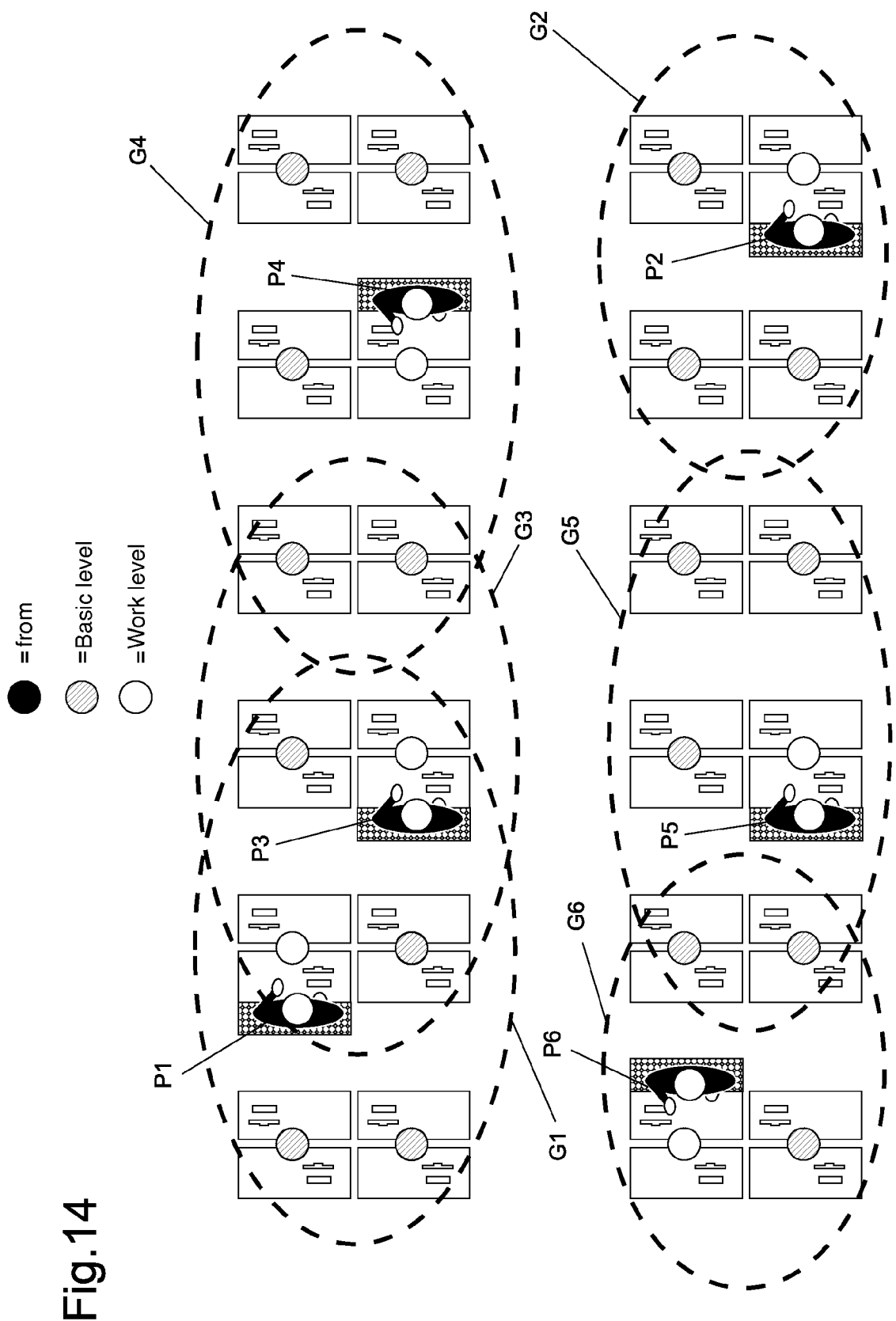

Three additional persons P4, P5, and P6 enter the open-plan office in FIG. 13 and take seats at workstations A20, A27, and A34 according to FIG. 14. As a consequence thereof, the luminaires L10, L13, and L18 switch to working level. The luminaires L9, L11, L12 belonging to group G4 and not yet in background level switch to background level, likewise the luminaires L14, L15, L16, L17, L19, and L20 belonging to group G5 and group G6.

According to FIG. 14, all luminaires L1 to L24 are illuminated in the open-plan office, however at different levels. The luminaires L3, L6, L10, L13, L18, and L24 illuminate at working level. The remaining luminaires L1, L2, L3-L5, L7-L9, L11-L12, L14-L17, L19-L23 are at background level.

Figure 15:
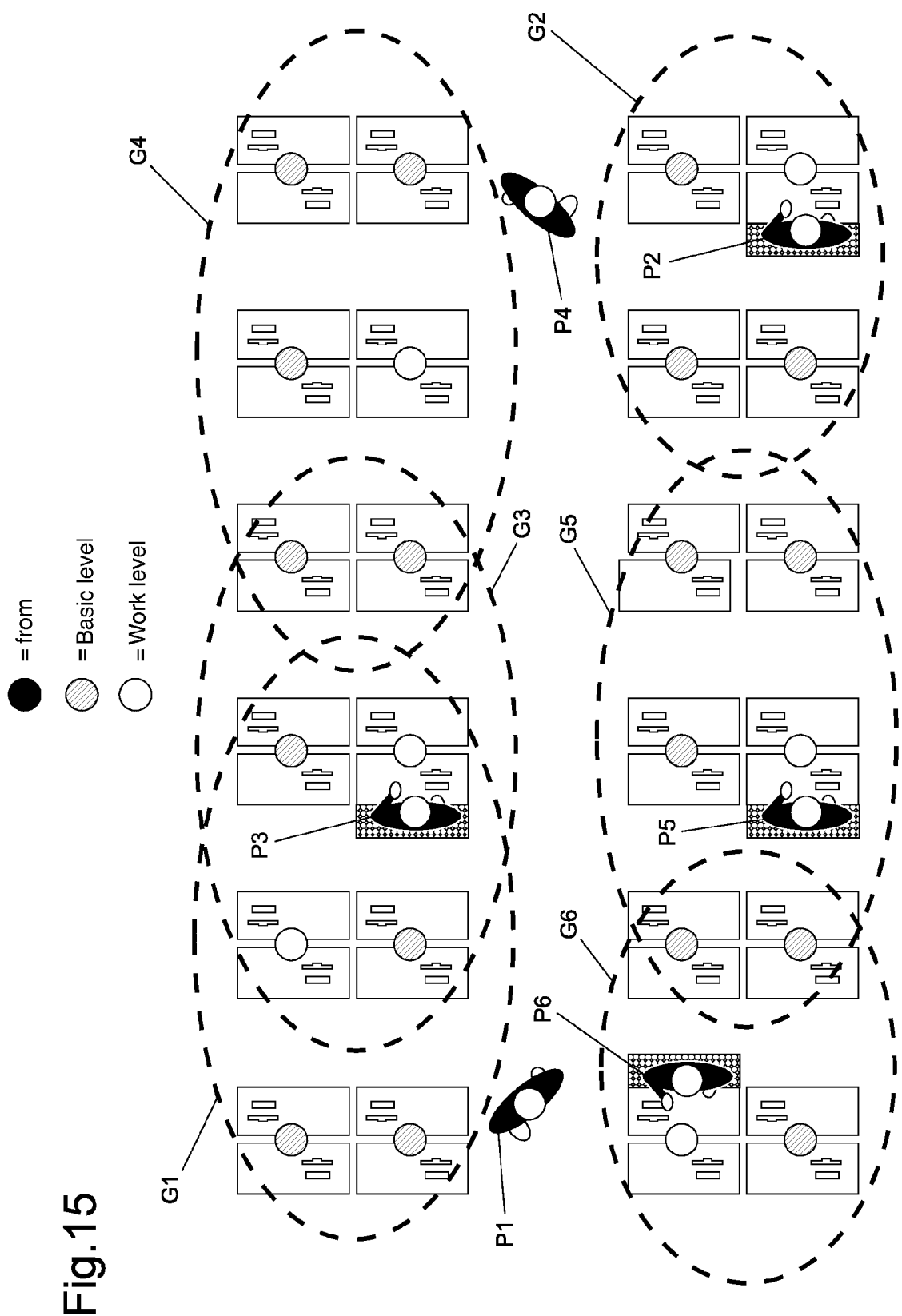
Figure 16:
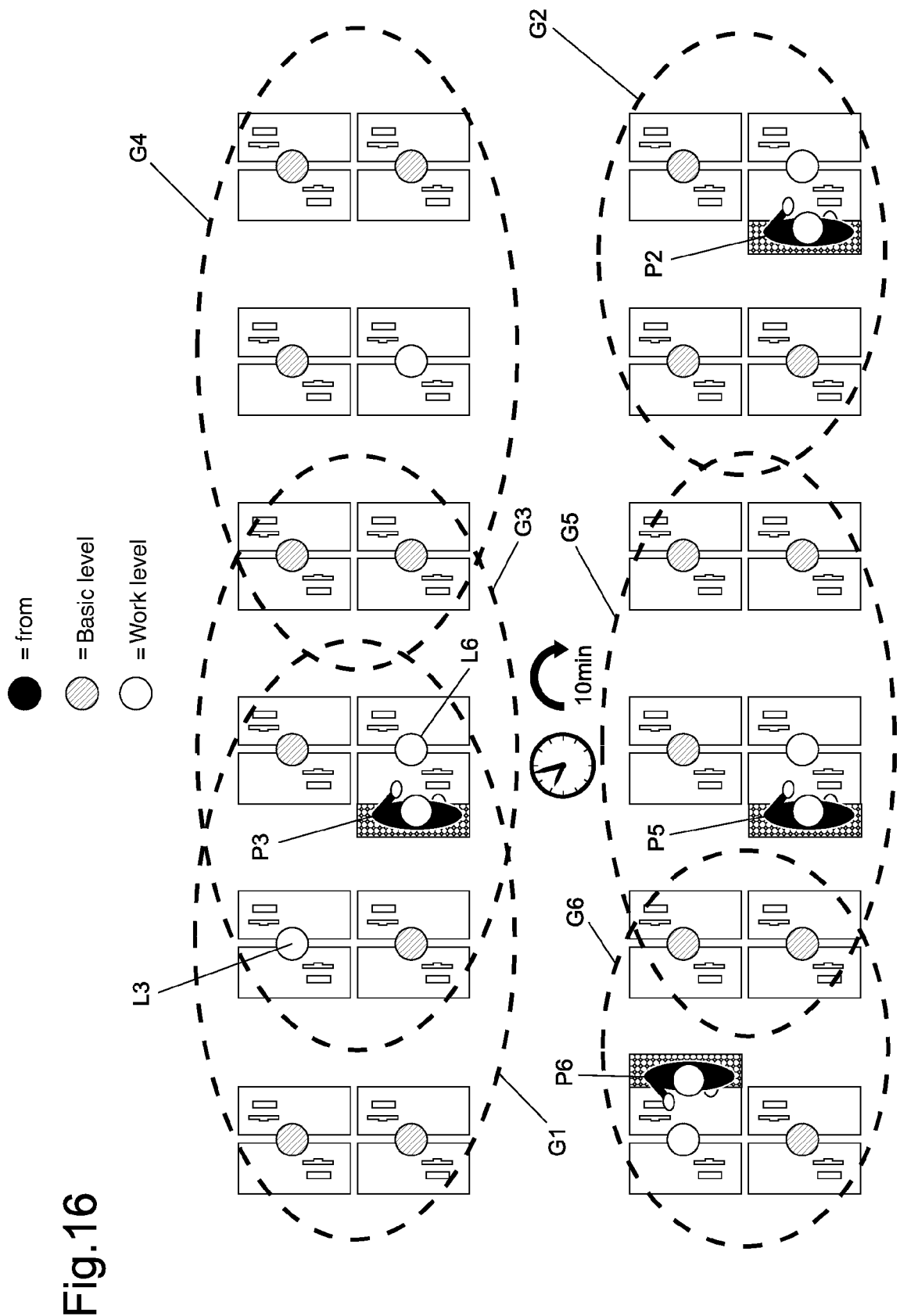
Figure 17:
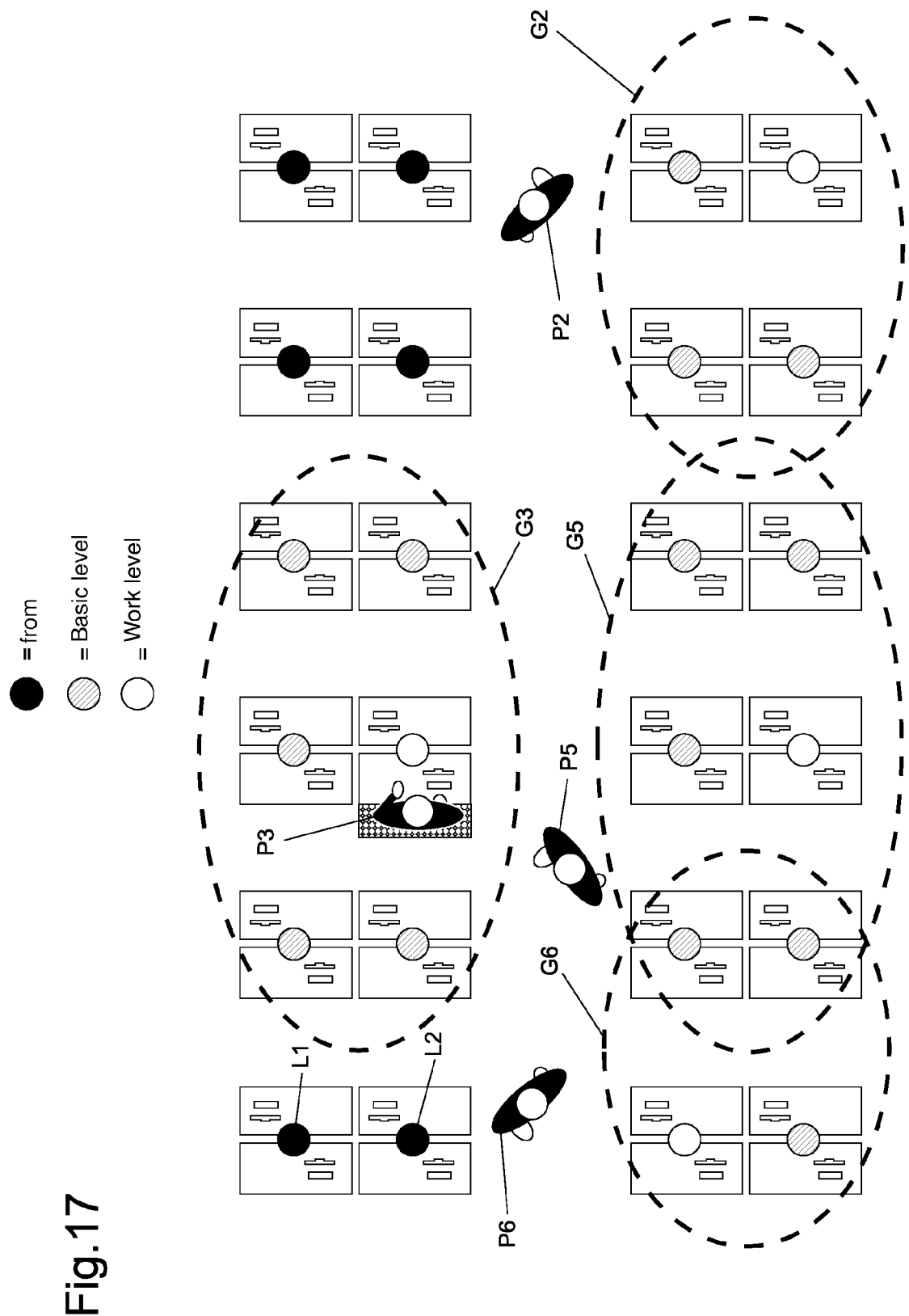
Figure 18:
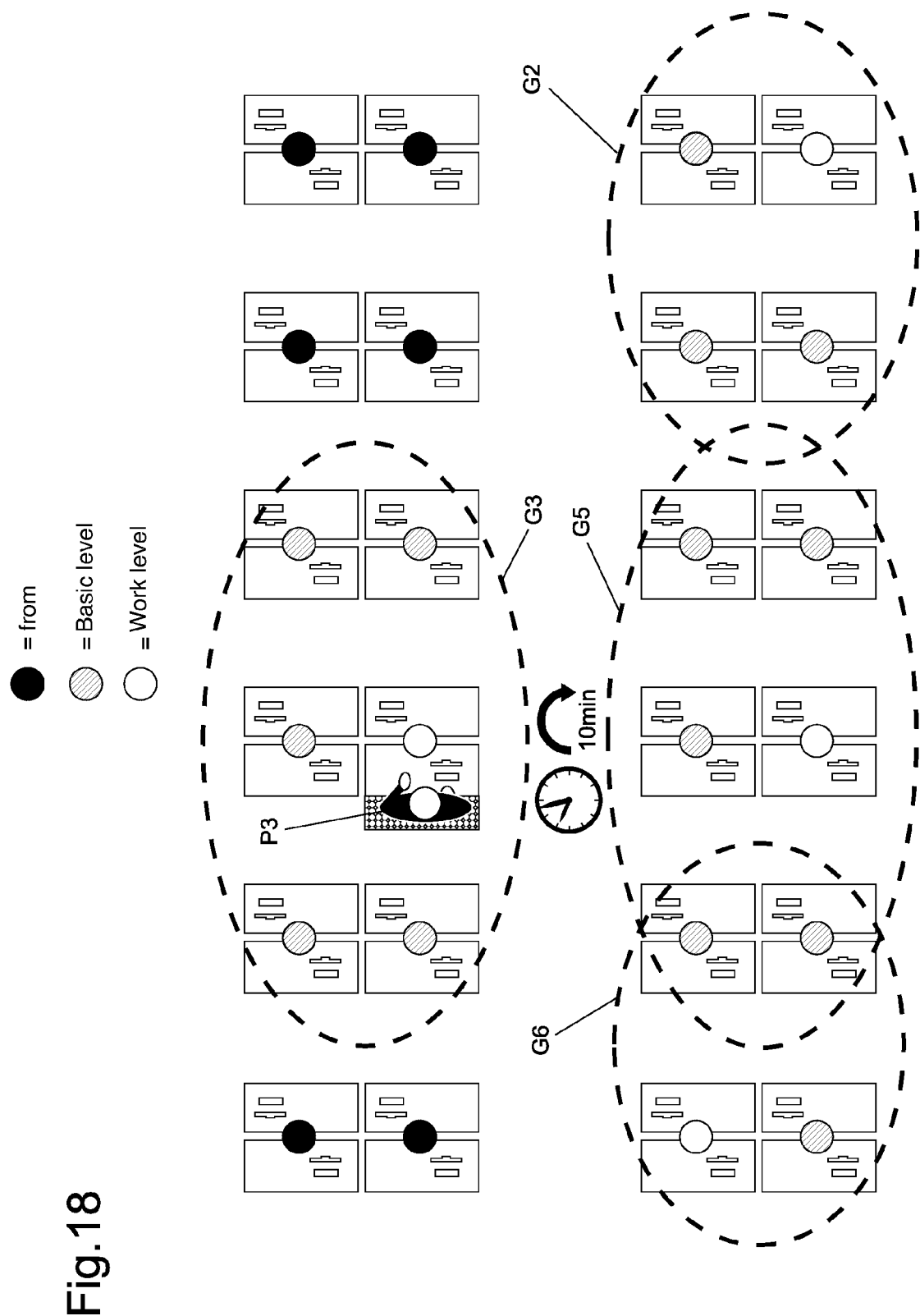
Figure 19:
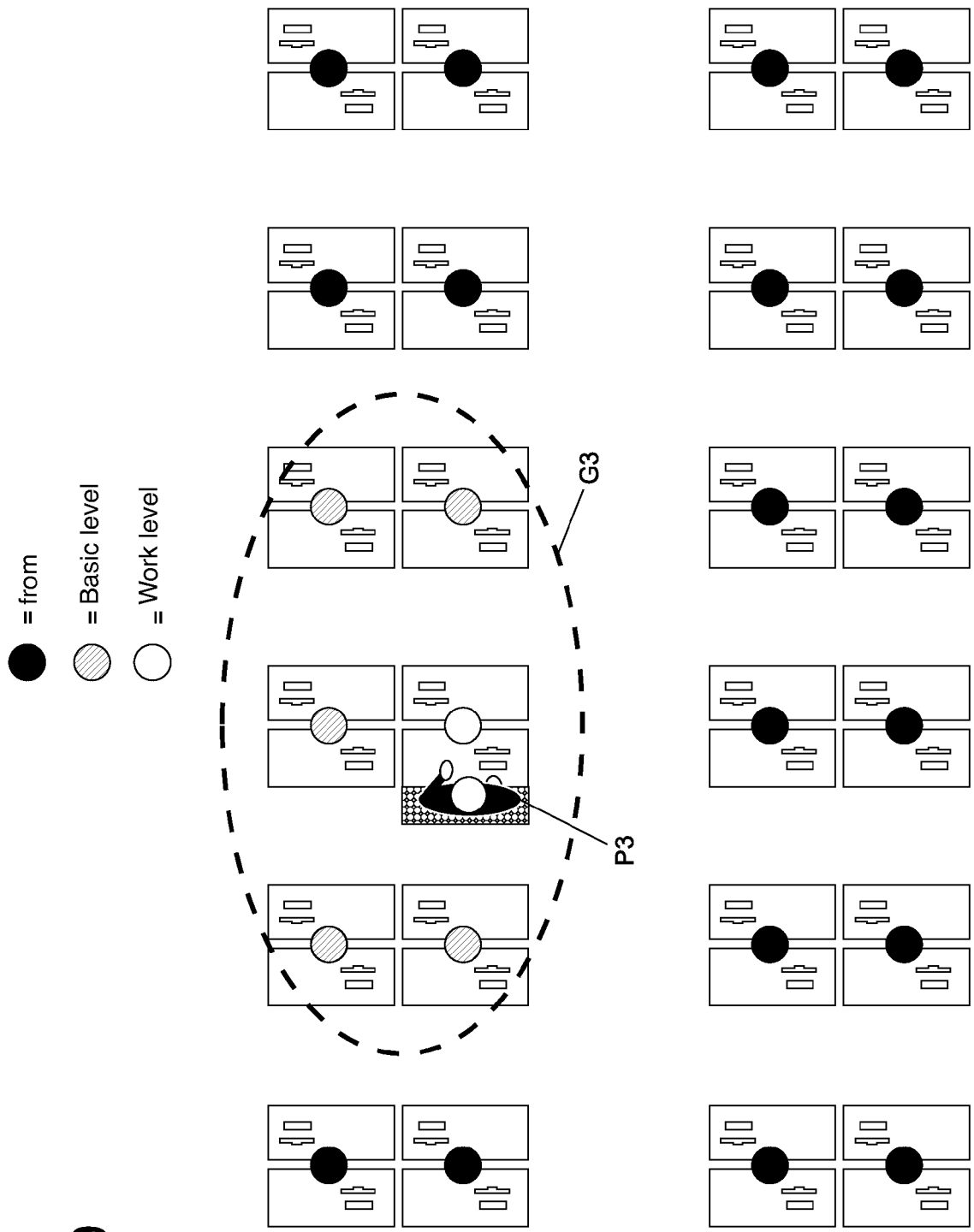

In the situation depicted in FIG. 15, persons P1 and P4 leave their respective workstations A5 and A22. The illumination remains unchanged from the illumination situation from FIGS. 14 and 15 for a predefined shutoff delay, of e.g. 10 minutes, as shown in FIG. 16. After this shutoff delay, the luminaire L3 would, due to the fact that the respective person P1 left workstation A5, go to the operating state "off." However, luminaire L3 is located in the direct vicinity of luminaire L6, at which person P3 is still sitting. Therefore, luminaire L3 does not switch off completely, but goes into the background level. However, the luminaires L1 and L2 belonging to group G1 do switch off. As is additionally clear from FIG. 17, the persons P2, P5, and P6 leave their respective workstations A34, A37, and A46. The illumination state of the luminaires L13 to L24 does not change for the listed shutoff delay (cf. for this FIG. 18). However, following the expiration of this shutoff delay, all luminaires L13 to L24 go to the off state.

Figure 20:
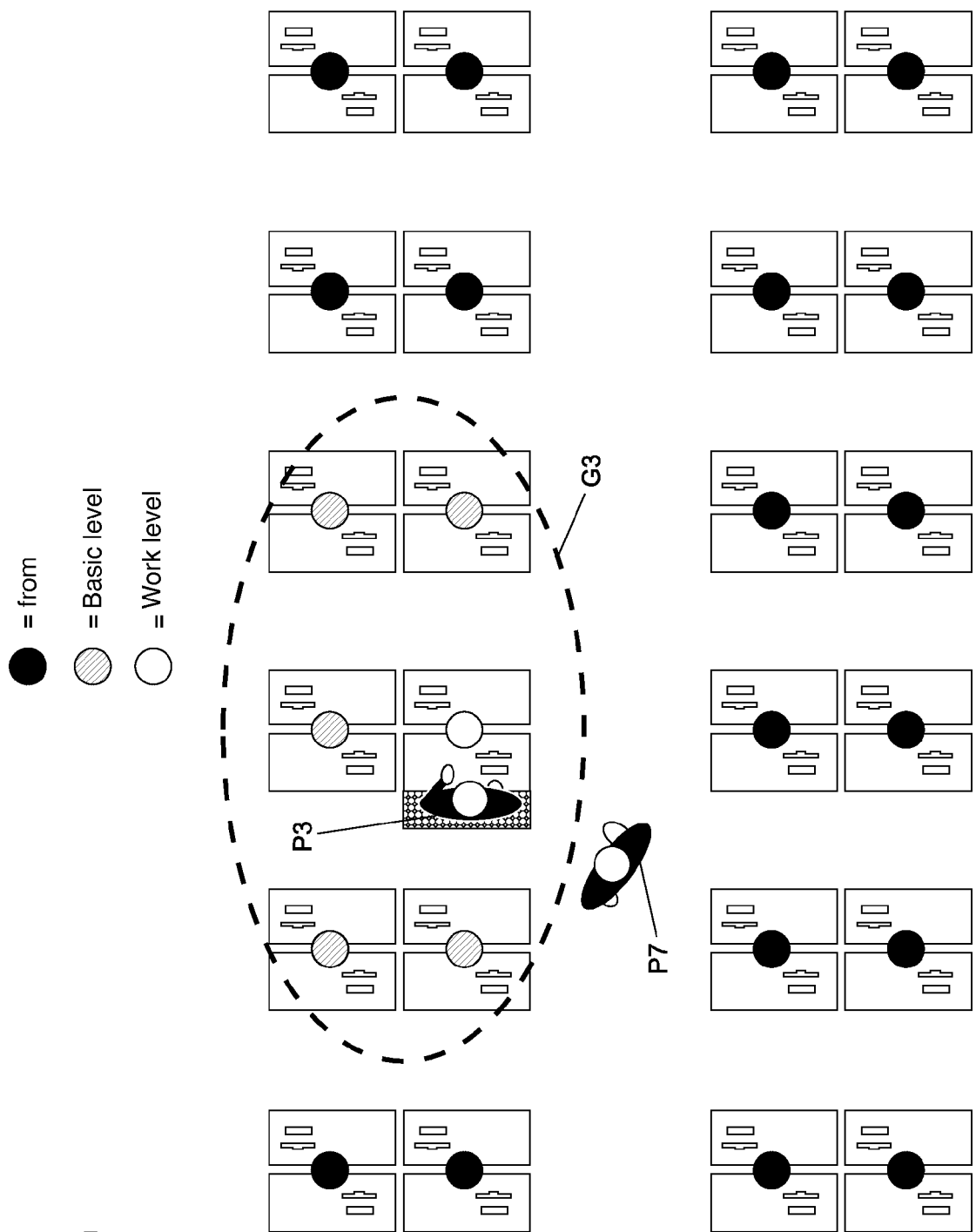
Figure 21:
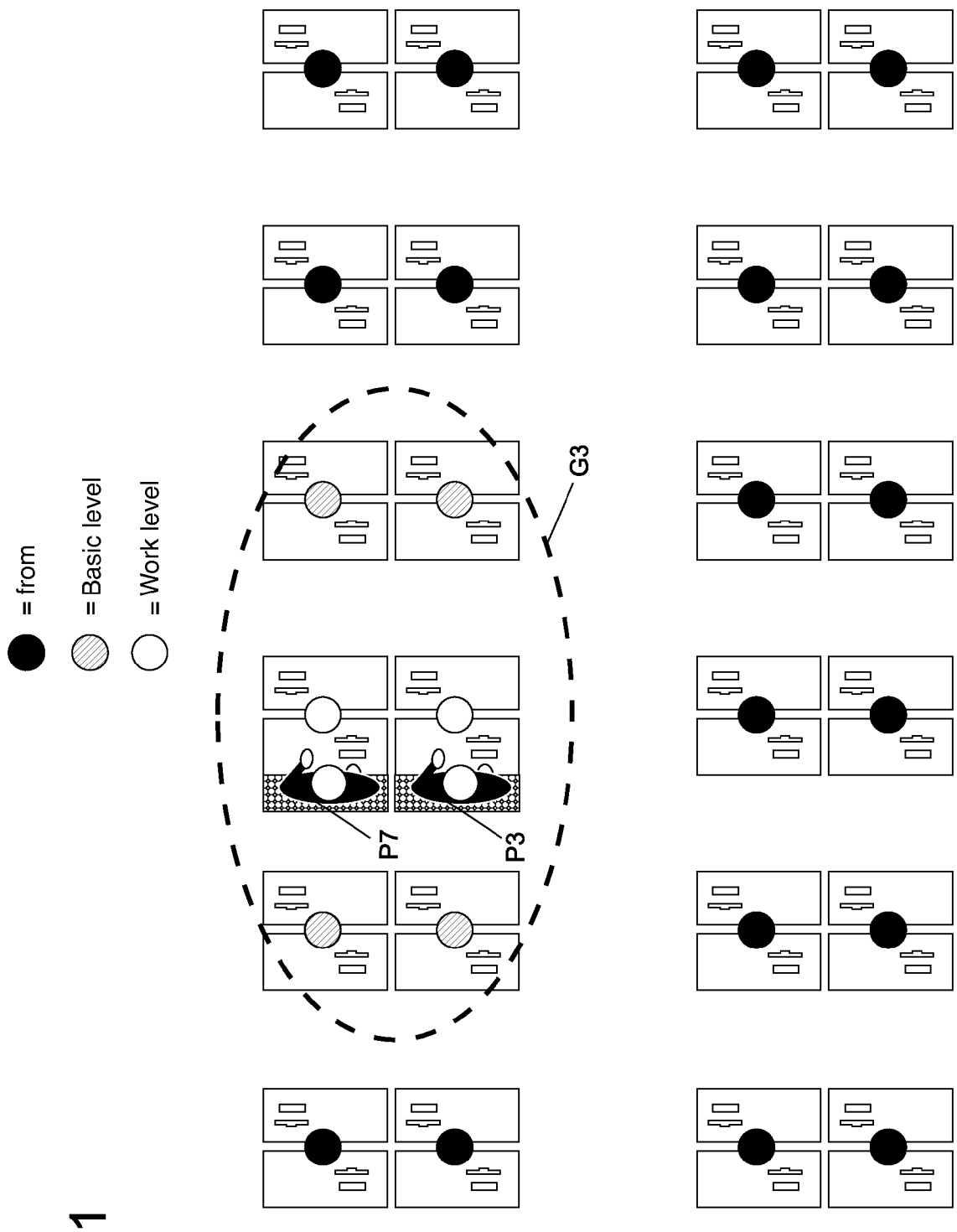

A new person P7 enters the room in FIG. 20 and sits according to FIG. 21 at workstation A9 and thus next to person P3. Due to presence detection by means of a sensor device at luminaire L5, said luminaire switches into working level. Said luminaire L5 was previously in background level because it is directly adjacent to luminaire L6, which is in working level.

Figure 22:
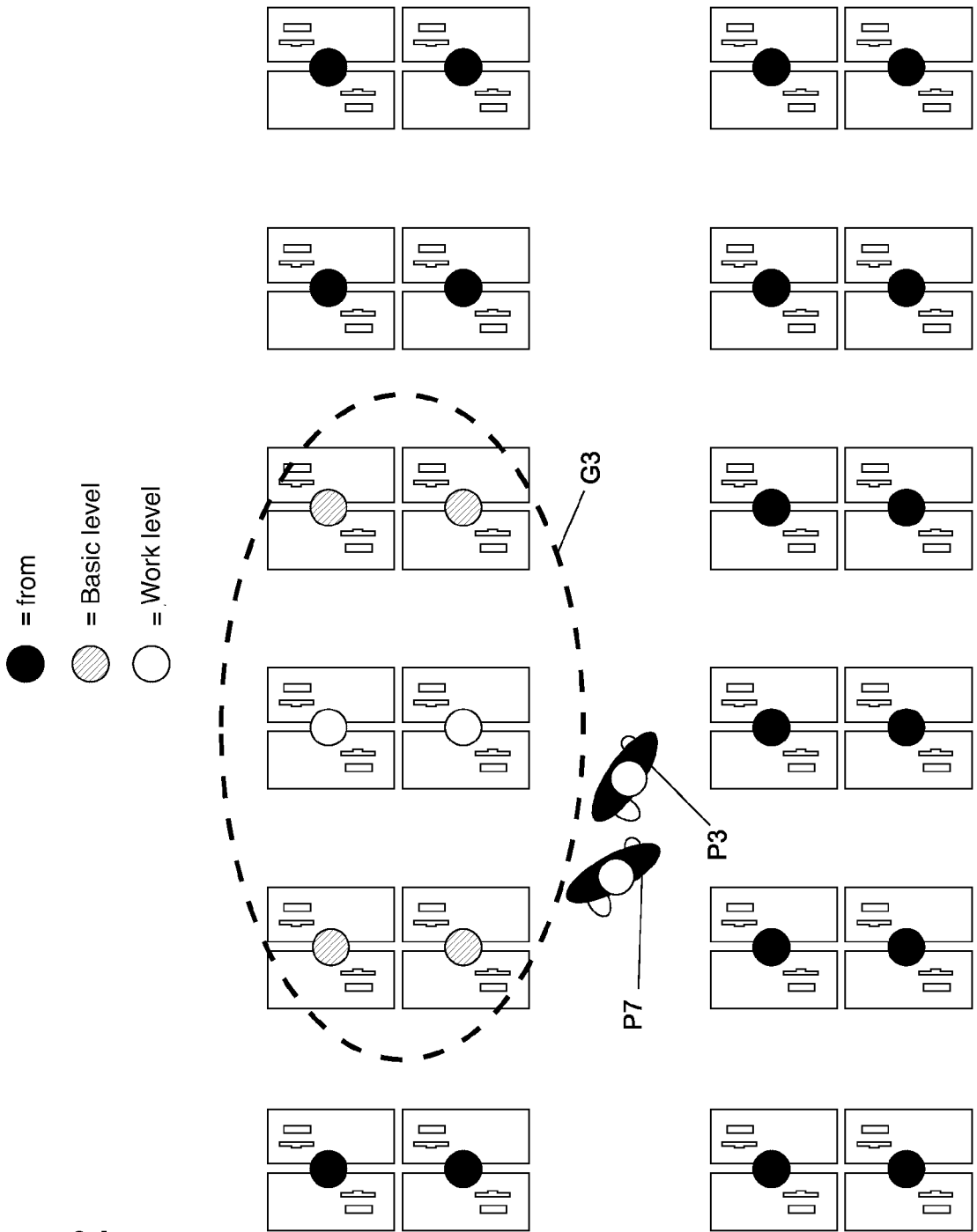
Figure 23:
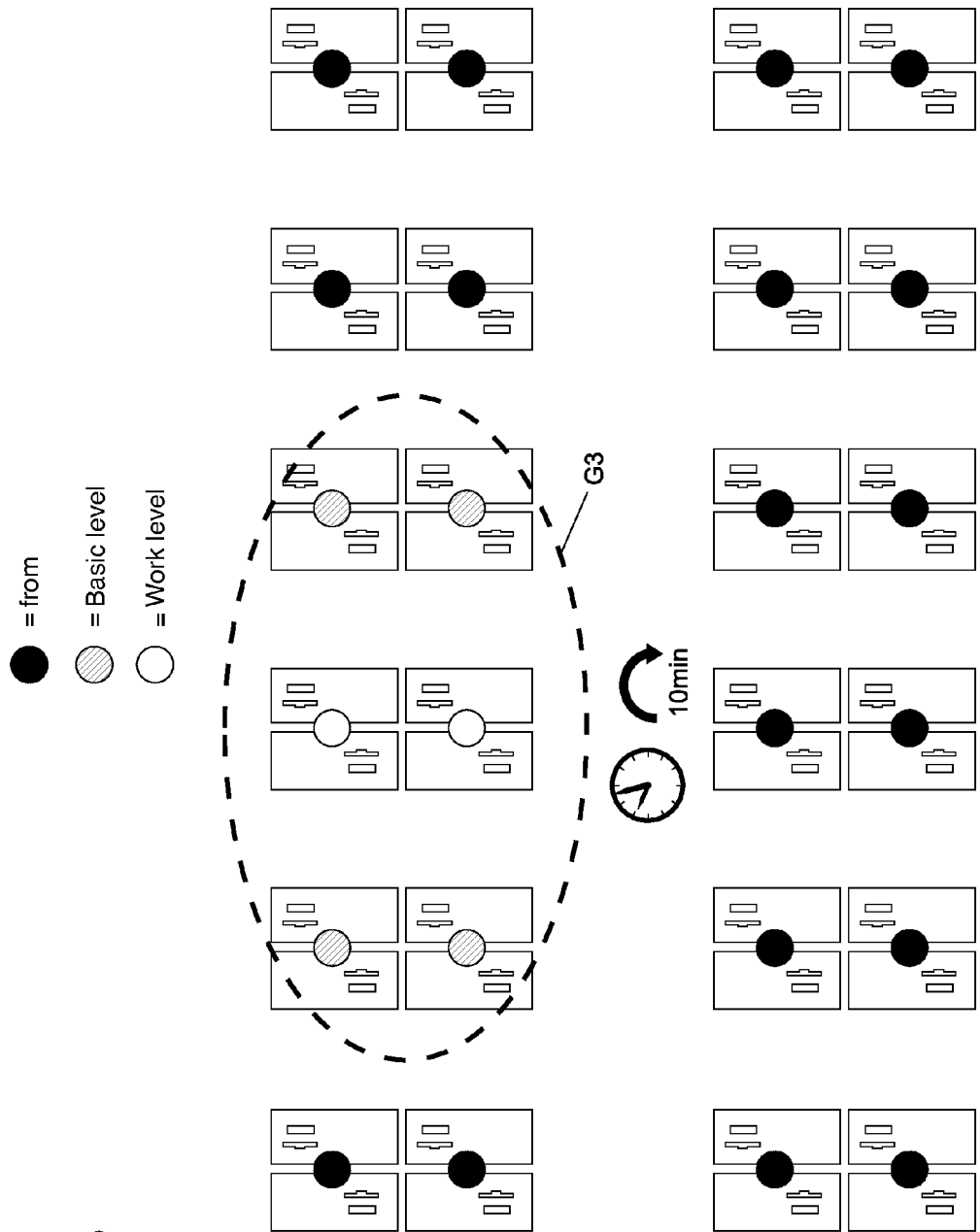

Subsequently, the two persons P3 and P7 leave their respective workstations A9, A10 according to FIG. 22. The illumination in the group G3 remains initially unchanged, i.e. the luminaires L5 and L6 remain, until the expiration of the shutoff delay (cf. FIG. 23) at working level and the luminaires L3, L4, L7, and L8 located in the direct vicinity thereto remain at background level.

Figure 24:
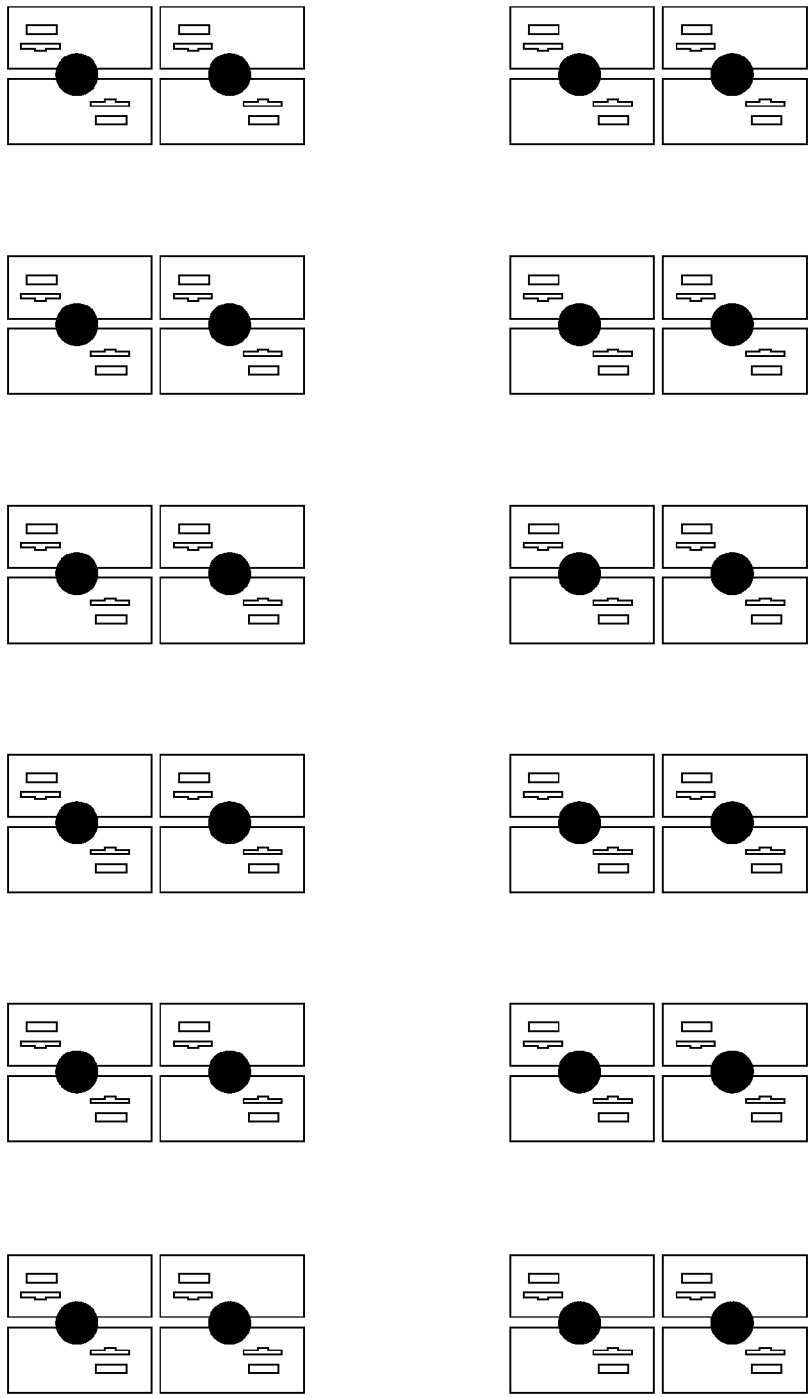

Subsequently all luminaires L3 to L8 of the group G3 switch off, as is depicted in FIG. 24. The open-plan office is dark.

By means of a switch device not depicted in FIGS. 6-24, all luminaires L1-L24 can be switched on simultaneously in order e.g. to enable a cleaning crew to clean the open-plan office at complete illumination.

LIST OF REFERENCES off operating mode "off"
AN operating mode "working level"
GN operating mode "background level"
A1 . . . A48 workstations 1-48
B1 . . . B11 areas 1-11
B operating device
EL1, EL2 installed luminaires
GE building
G1 . . . G6 groups 1-6
MK communication module
L1 . . . L24 luminaires 1-24
L1 . . . L24 luminaires 1-24
LF luminaire base
LG luminaire housing
L cable
LS luminaire rod
MS manually actuated switch device
P1 . . . P7 persons 1-7
SE sensor device
S1 . . . S4 switch 1-4
T1, T2 button The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. An intelligent interior lighting device comprising: (a) multiple luminaires, which are at least partially coupled to each other with a communication device, (b) a wireless communication device via which the luminaires at least partially communicate with each other, (c) wherein each of the luminaires is assigned to one, preferably two or more groups, each group consisting of multiple luminaires, wherein each group has its own group address, (d) wherein each luminaire further comprises a built-in manually operable switch device for individual switching of said luminaire, (e) wherein each luminaire has at least the following operating modes: off, "background level", and "working level", (f) wherein the interior lighting device can be set so that the switching on of one luminaire in a group also illuminates the other luminaires of said group, and (g) wherein, the interior lighting device can be set so that the switching of one luminaire in the group to "working level" also illuminates all other luminaires in said group at "background level".

2. The intelligent lighting device of claim 1, further comprising wherein the background level and/er the working level can be adjusted.

3. The intelligent lighting device of claim 1, further comprising wherein each of the groups is assigned to a predefined area with an area address.

4. The intelligent lighting device of claim 3, further comprising wherein the predefined area is assigned with the area address of a different floor or a different room within a building.

5. The intelligent lighting device of claim 1, further comprising wherein the groups assigned to a luminaire overlap.

6. The intelligent lighting device of claim 3, further comprising wherein the area address and/or at least one group address can be entered manually at a luminaire via a mechanical switch devices.

7. The intelligent lighting device of claim 1, further comprising wherein the luminaires belong to a group of luminaires, which luminaires are arranged directly adjacent to each other.

8. The intelligent lighting device of claim 1, further comprising wherein the luminaires are equipped at least partially with a sensor device, wherein upon detection of a person in the sensor area the respective luminaire (presence detection) switches on.

9. The intelligent lighting device of claim 8, further comprising wherein that during manual switching on of a luminaire or upon presence detection at one luminaire, said luminaire can be switched on to working level and the other luminaires belonging to the same group and to the same area either receive wireless communication from the switched-on luminaire or autonomously switch into the background level, provided the other luminaire or the other luminaires are not already switched to working level.

10. The intelligent lighting device of claim 9, further comprising wherein a luminaire which is at working level, can have its working level state communicated at intervals to the other luminaires, preferably at 10- to 20-second intervals.

11. The intelligent lighting device of claim 1, further comprising wherein that switching off one luminaire is detectable by other luminaires belonging to the same area and to the same group.

12. The intelligent lighting device of claim 1, further comprising wherein that a shutoff delay of multiple minutes is provided, in particular 5 to 30 minutes, preferably approximately 10 minutes, and the lack of a presence detection is only communicable to other luminaires in the same group and in the same area after the expiration of said shutoff delay.

13. The intelligent lighting device of claim 1, further comprising wherein that a manually actuatable switch device is provided, via which all luminaires or all luminaires of an area or all luminaires of one or more groups can be wirelessly switched off or can be switched on at the maximum light intensity (working level).

14. The intelligent lighting device according to claim 1, further comprising a manually actuatable switch device, via which at least one luminaire can be switched on and/or can be dimmed to working level.

15. The intelligent lighting device of claim 1, further comprising wherein the wireless communication device has individual communication modules, which are arranged preferably replaceably on or in the luminaires.

16. The intelligent lighting device of claim 15, further comprising wherein the manually operable switch devices for specifying the area address and/or group address are arranged in the communication modules.

17. The intelligent lighting device of claim 1, further comprising wherein the luminaires are free-standing luminaires or desk-mounted luminaires.

18. A method for operating the lighting device of claim 1, comprising the following steps: (i) switching on one of the luminaires of a group to the "working level", (ii) the switched-on luminaire communicates its "working level" state to the remaining luminaires in the same group via the communication device, (iii) the remaining luminaires of the group each switch to the "background level" and (iv) the switching off of all luminaires in the group after a predetermined time during which no presence is detected.

* * * * *